United States Patent
Kim et al.

(10) Patent No.: US 9,215,462 B2
(45) Date of Patent: Dec. 15, 2015

(54) IMAGE ENCODING/DECODING METHOD AND DEVICE

(71) Applicant: SK TELECOM CO., LTD., Seoul (KR)

(72) Inventors: Sunyeon Kim, Seoul (KR); Jeongyeon Lim, Seongnam-si (KR); Joohee Moon, Seoul (KR); Yunglyul Lee, Seoul (KR); Haekwang Kim, Seoul (KR); Byeungwoo Jeon, Seongnam-si (KR); Hyoungmee Park, Suwon-si (KR); Mincheol Park, Bucheon-si (KR); Dongwon Kim, Seoul (KR); Kibaek Kim, Seoul (KR); Juock Lee, Seoul (KR); Jinhan Song, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 14/676,129

(22) Filed: Apr. 1, 2015

(65) Prior Publication Data

US 2015/0281690 A1    Oct. 1, 2015

Related U.S. Application Data

(63) Continuation of application No. 14/505,008, filed on Oct. 2, 2014, now Pat. No. 9,118,921, which is a continuation of application No. 13/516,687, filed as application No. PCT/KR2010/009086 on Dec. 17, 2010, now Pat. No. 8,885,711.

(30) Foreign Application Priority Data

Dec. 17, 2009    (KR) .......................... 10-2009-0126276
Dec. 17, 2010    (KR) .......................... 10-2010-0129988

(51) Int. Cl.
*H04N 7/12*      (2006.01)
*H04N 19/107*    (2014.01)
(Continued)

(52) U.S. Cl.
CPC ......... *H04N 19/107* (2014.11); *H04N 7/26335* (2013.01); *H04N 7/26941* (2013.01);
(Continued)

(58) Field of Classification Search
CPC . H04N 7/50; H04N 7/26335; H04N 7/26941; H04N 7/26244
USPC ............. 375/240.25, 240.26, 240.16, 240.12, 375/240.15; 382/233, 235, 238, 236
See application file for complete search history.

(56) References Cited

U.S. PATENT DOCUMENTS 8,279,923 B2 * 10/2012 Lim .................... H04N 19/147 375/240.01
8,503,527 B2 * 8/2013 Chen ................ H04N 19/00763 375/240.12

(Continued)

FOREIGN PATENT DOCUMENTS

KR    10-2002-0077630 A    10/2002
KR    10-2008-0104385 A    12/2008
KR    10-2009-0108110 A    10/2009

OTHER PUBLICATIONS

International Search Report mailed Aug. 3, 2011 for PCT/KR2010/009086.

*Primary Examiner* — Shawn An
(74) *Attorney, Agent, or Firm* — Hauptman Ham, LLP

(57) ABSTRACT

A video decoding apparatus includes an encoding information decoder to reconstruct a skip information indicating whether a block to be decoded in an image is a skip block by decoding a bitstream, and reconstruct either a skip motion information of the block, or an intra or inter prediction information of the block and a transform information of the block by decoding the bitstream, according to the skip information; and a video decoder to either reconstruct the block based on the skip motion information or reconstruct the block based on both the prediction information and a residual signal information reconstructed by decoding the bitstream based on the transform information, wherein the encoding information decoder is configured to reconstruct the transform information which includes partition information related to partitioning the block into subblocks by a tree structure.

17 Claims, 16 Drawing Sheets

(51) Int. Cl.
  H04N 19/61    (2014.01)
  H04N 19/00    (2014.01)
  H04N 19/40    (2014.01)
  H04N 19/70    (2014.01)
  H04N 19/119   (2014.01)
  H04N 19/96    (2014.01)
  H04N 19/109   (2014.01)
  H04N 19/124   (2014.01)
  H04N 19/179   (2014.01)
  H04N 19/136   (2014.01)
  H04N 19/44    (2014.01)
  H04N 19/52    (2014.01)
  H04N 19/533   (2014.01)
  H04N 19/57    (2014.01)
  H04N 19/593   (2014.01)
  H04N 19/132   (2014.01)
  H04N 19/137   (2014.01)
  H04N 19/176   (2014.01)

(52) U.S. Cl.
  CPC ............ *H04N 7/50* (2013.01); *H04N 19/0003* (2013.01); *H04N 19/00139* (2013.01); *H04N 19/00533* (2013.01); *H04N 19/109* (2014.11); *H04N 19/119* (2014.11); *H04N 19/124* (2014.11); *H04N 19/132* (2014.11); *H04N 19/136* (2014.11); *H04N 19/137* (2014.11); *H04N 19/176* (2014.11); *H04N 19/179* (2014.11); *H04N 19/40* (2014.11); *H04N 19/44* (2014.11); *H04N 19/52* (2014.11); *H04N 19/533* (2014.11); *H04N 19/57* (2014.11); *H04N 19/593* (2014.11); *H04N 19/61* (2014.11); *H04N 19/70* (2014.11); *H04N 19/96* (2014.11); *H04N 7/26244* (2013.01)

(56) References Cited

U.S. PATENT DOCUMENTS

| | | | |
|---|---|---|---|
| 8,885,711 B2 | 11/2014 | Kim et al. | |
| 2010/0086051 A1* | 4/2010 | Park | H04N 19/176 375/240.16 |
| 2012/0308148 A1* | 12/2012 | Kim | H04N 19/00 382/233 |

* cited by examiner

Layer 0

Layer 1

Layer $\log_2(N/4)$

FIG. 5A

Block Mode = Skip Mode

| Skip Information | First Partition Information | Skip Motion Information |

FIG. 5B

Block Mode ≠ Skip Mode

| Skip Information | Prediction Type Information | First Partition Information | Intra Prediction Mode Information or Motion Information and Reference Picture Information | Transform Information | Coefficient Information |

| Mx(0,0) | Mx(0,1) | Mx(0,2) | Mx(0,3) | . . . |
|---------|---------|---------|---------|-------|
| Mx(1,0) | Mx(1,1) | Mx(1,2) | Mx(1,3) | . . . |
| Mx(2,0) | Mx(2,1) | Mx(2,2) | Mx(2,3) | . . . |
| Mx(3,0) | Mx(3,1) | Mx(3,2) | Mx(3,3) | . . . |
| ⋮ | ⋮ | ⋮ | ⋮ | |

*FIG. 6A*

| $M_{x-1}(0,0)$ | $M_{x-1}(0,1)$ | . . . |
|---|---|---|
| $M_{x-1}(1,0)$ | $M_{x-1}(1,1)$ | . . . |
| ⋮ | ⋮ | |

$M_{x-1}(0,0) = \min \{M_x(0,0), M_x(0,1), M_x(1,0), M_x(1,1)\}$
$M_{x-1}(0,1) = \min \{M_x(0,2), M_x(0,3), M_x(1,2), M_x(1,3)\}$
$M_{x-1}(1,0) = \min \{M_x(2,0), M_x(2,1), M_x(3,0), M_x(3,1)\}$
$M_{x-1}(1,1) = \min \{M_x(2,2), M_x(2,3), M_x(3,2), M_x(3,3)\}$

*FIG. 6B*

| $M_0(0,0)$ |
|---|

$M_0(0,0) = \min \{M_1(0,0), M_1(0,1), M_1(1,0), M_1(1,1)\}$

*FIG. 6D*

| $M_1(0,0)$ | $M_1(0,1)$ |
|---|---|
| $M_1(1,0)$ | $M_1(1,1)$ |

$M_1(0,0) = \min \{M_2(0,0), M_2(0,1), M_2(1,0), M_2(1,1)\}$
$M_1(0,1) = \min \{M_2(0,2), M_2(0,3), M_2(1,2), M_2(1,3)\}$
$M_1(1,0) = \min \{M_2(2,0), M_2(2,1), M_2(3,0), M_2(3,1)\}$
$M_1(1,1) = \min \{M_2(2,2), M_2(2,3), M_2(3,2), M_2(3,3)\}$

*FIG. 6C*

Final Bit: 1 0A 1 0B 1 1 0C 0C 1 0B 0C 0C 0C B A B B B C B A

| A | A | B | B | B | A | C | C |
| A | A | A | A | B | B | C | C |
| A | C | A | C | C | C | B | C |
| A | B | C | B | C | C | B | A |
| B | C | B | C | B | B | C | C |
| A | A | B | C | B | A | A | C |
| B | B | C | B | C | A | A | C |
| B | B | B | B | C | C | B | C |

FIG. 18

| A | A | B | B | B | A | C | |
| C | A | A | A | B | B | | |
| A | C | A | C | | | B | C |
| A | B | C | B | | C | B | A |
| B | C | B | C | B | B | C | C |
| A | A | B | C | B | A | A | C |
| B | | C | B | C | A | A | C |
| | | B | B | C | C | B | C |

FIG. 19

IMAGE ENCODING/DECODING METHOD AND DEVICE

CROSS-REFERENCE TO RELATED APPLICATIONS

The present application is a continuation of U.S. patent application Ser. No. 14/505,008 filed Oct. 2, 2014, which is a continuation of U.S. patent application Ser. No. 13/516,687 (U.S. Pat. No. 8,885,711) filed Aug. 31, 2012, which is a the National Phase application of International Application No. PCT/KR2010/09086, filed Dec. 17, 2010, which is based upon and claims the benefit of priorities from Korean Patent Application No. 10-2010-0129988, filed on Dec. 17, 2010 and Korean Patent Application No. 10-2009-0126276, filed on Dec. 17, 2009. The disclosures of the above-listed applications are hereby incorporated by reference herein in their entirety.

TECHNICAL FIELD

The present disclosure relates to a video encoding/decoding method and apparatus to improve the video compression efficiency by efficiently encoding the encoding information used for the video encoding and selectively using various encoding methods and decoding methods in the video encoding.

BACKGROUND

The statements in this section merely provide background information related to the present disclosure and may not constitute a prior art.

Video data compression technologies include the standards of H.261, H.263, MPEG-2, and MPEG-4. According to the standards of the video data compression technologies, each image is encoded by partitioning the same into fixedly sized macroblocks which are composed of rectangular 16×16 pixel areas of a luminance or luma component and rectangular 8×8 pixel areas of a chrominance or chroma component. All of the luminance and chrominance components of the respective macroblocks are spatially or temporally predicted, and the resultant predicted residuals undergo transform, quantization, and entropy coding to be transmitted.

In a block mode used in an existing video encoding apparatus, no more information is encoded than a flag for indicating that a block to be currently encoded is a block using a predicted motion vector and having no transform coefficient to be encoded. Then, in the case of a block using no predicted motion vector or having a transform coefficient to be encoded, block type information and prediction information (a difference vector between a motion vector and a predicted motion vector and a reference picture index) are encoded and the transform coefficient is also encoded.

However, in the aforementioned known video compression technologies, the inventor(s) has experienced that there are problems with achieving (i) an efficient encoding of such blocks that have only a differential motion vector as data to be encoded but no transform coefficient to be encoded, or (ii) an efficient encoding of such blocks that have no differential motion vector but only the transform coefficient to be encoded. The inventor(s) has also experienced that there is a difficulty with achieving an efficient encoding of various information used for encoding videos and the like.

SUMMARY

In accordance with some embodiments of the present disclosure, a video decoding apparatus comprises an encoding information decoder and a video decoder. The encoding information decoder is configured to reconstruct a skip information indicating whether a block to be decoded in an image is a skip block by decoding a bitstream, and reconstruct either a skip motion information of the block, or an intra or inter prediction information of the block and a transform information of the block by decoding the bitstream, according to the skip information. And the video decoder is configured to either reconstruct the block based on the skip motion information or reconstruct the block based on both the prediction information and a residual signal information reconstructed by decoding the bitstream based on the transform information. Herein, the encoding information decoder is configured to reconstruct the transform information which includes partition information related to partitioning the block into subblocks by a tree structure. The partition information is reconstructed by reconstructing a side information containing a first information on a difference between a maximum subblock size and a minimum subblock size and a second information on the minimum subblock size by decoding the bitstream, reconstructing a flag indicating whether each node from a highest layer toward the lowest layer is partitioned into nodes of a lower layer by decoding the bitstream based on the side information, and identifying a node which is not further partitioned. The video decoder reconstructs the residual signal information of a subblock corresponding to the node which is not further partitioned.

In accordance with some embodiments of the present disclosure, a video decoding apparatus is configured to reconstruct a skip information indicating whether a block to be decoded in an image is a skip block by decoding a bitstream; reconstruct a skip motion information of the block, or reconstructing a prediction information containing an intra prediction mode information or a motion information and a transform information of the block by decoding the bitstream, according to the skip information; and reconstruct the block based on the skip motion information or reconstructing the block based on both the prediction information and a residual signal information reconstructed by decoding the bitstream based on the transform information. The video encoding apparatus is further configured to reconstruct the transform information which includes partition information related to partitioning the block into subblocks by a tree structure. Herein, the partition information is reconstructed by reconstructing a side information containing a first information on a difference between a maximum subblock size and a minimum subblock size and a second information on the minimum subblock size by decoding the bitstream, reconstructing a flag indicating whether a node for each layer from a highest layer toward the lowest layer is partitioned by decoding the bitstream based on the side information, and identifying a node which is not further partitioned. And the residual signal information is reconstructed for a subblock corresponding to the node which is not further partitioned.

DESCRIPTION OF DRAWINGS

FIG. 5A is an example of a syntax structure of the bitstream when a block to be encoded is a skip block, and FIG. 5B is an example of a syntax structure of an encoded bitstream when the block to be encoded is not the skip block;

FIG. 6A illustrates the subblocks included in the block to be encoded and the partition information of the respective subblocks, FIG. 6B illustrates a result of grouping subblocks illustrated in FIG. 6A and allocating partition information to each of the groups, FIG. 6C illustrates a result of grouping subblocks illustrated in FIG. 6B and allocating partition information to each of the groups, FIG. 6D illustrates a result of grouping subblocks illustrated in FIG. 6C and allocating partition information to each of the groups.

FIGS. 18 and 19 are examples of a method of grouping information of areas when information on the areas is distributed in a different scheme according to at least one embodiment of the present disclosure;

DETAILED DESCRIPTION

Figure 1:
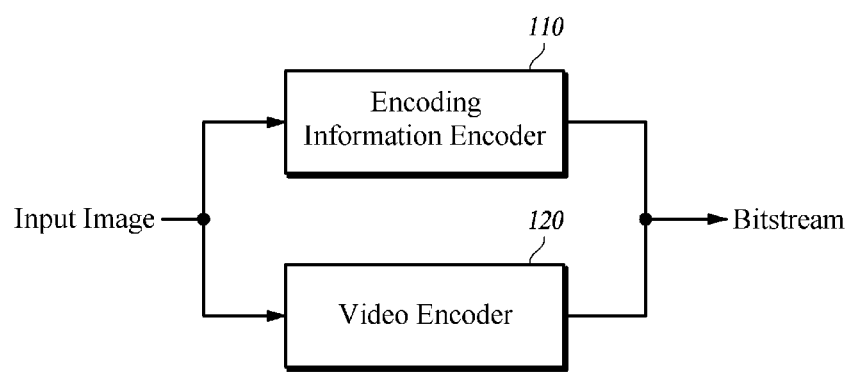
FIG. 1 is a block diagram of a video encoding apparatus according to a first exemplary embodiment of the present disclosure.

Some embodiments of the present disclosure provide improvement to the video compression efficiency by efficiently encoding the encoding information used for the video encoding and selectively using various encoding methods and decoding methods in encoding the video.

A video encoding apparatus or video decoding apparatus described hereinafter may be a user terminal including a personal computer or PC, notebook computer, personal digital assistant or PDA, portable multimedia player or PMP, PlayStation Portable or PSP, or mobile communication terminal, smart phone, television or such devices, and a server terminal including an application server and a service server, and represent a variety of apparatuses equipped with, for example, a communication device such as a modem for carrying out communication between various devices or wired/wireless communication networks, a memory for storing various programs and data for encoding or decoding an image or performing an inter or intra prediction for encoding or decoding, and a microprocessor for executing the programs to effect operations and controls.

In addition, the image encoded into a bitstream (encoded data) by the video encoding apparatus may be transmitted in real time or non-real-time to the video decoding apparatus via a wired/wireless communication network including the Internet, a short range wireless communication network, a wireless LAN network, a WiBro (Wireless Broadband) network, and a mobile communication network or various communication interfaces such as cable or USB (universal serial bus), and the transmitted image is decoded, reconstructed, and reproduced into the image in the video decoding apparatus.

Hereinafter, the description is provided based on the assumption that an input image is partitioned, encoded, and decoded by unit of macroblocks, but embodiments of the present disclosure are not limited thereto, and the input image may be partitioned into areas in various non-standardized shapes including a circle, a trapezoid, and a hexagon, rather than blocks in a standardized shape, and encoded and decoded by unit of partitioned areas.

Further, a macroblock may have a variable size, rather than a fixed size. In this event, a maximum size and a minimum size of an available macroblock and a size of a macroblock of a picture or an area to be currently encoded may be determined by unit of total sequences, Group of Pictures (GOPs), pictures, or slices, etc. and information on the size of a macroblock may be contained in a bitstream as header information. For example, allowable maximum size and minimum size for the macroblock and a size of a macroblock of a picture or an area to be currently encoded may be determined by unit of total sequences, Group of Pictures (GOPs), pictures, or slices, and the maximum size and the of minimum size to be encoded for the macroblock are inserted in a bitstream as header information of a sequence, a GOP, a picture, a slice, etc., and the macroblock of the picture or the area to be currently encoded may be variable-sized macroblock with a flag inserted for indicating whether the macroblock is partitioned from the macroblock having the maximum size in the bitstream.

In this event, the macroblock may be used with arbitrary maximum and minimum sizes by separately setting its horizontal size from its vertical size. Further, real scale may be designated as the values of the maximum and minimum sizes of the macroblock to be encoded or a value may be transmitted for designating a specific numerical value for scaling up or down from a predetermined macroblock size. Against the maximum macroblock size, to encode the multiplication value for transmission from the predetermined macroblock size with the predetermined size assumed to be 16, a value of $\log_2$ (selected MBsize/16) is encoded whereby '0' will be encoded when a size of the macroblock is 16×16, and '1' will be encoded when a size of the macroblock is 32×32, "1" for example. Further, a ratio of a horizontal size to a vertical size may be separately encoded.

Otherwise, after the value of the maximum size of the macroblock is encoded through the aforementioned method, the value of the minimum size of the macroblock may be encoded through a value of $\log_2$ (the maximum size of the macroblock/the minimum size of the macroblock) indicating a ratio of the minimum size of the macroblock to the maximum size of the macroblock. On the contrary, after the value of the minimum size of the macroblock is encoded through the aforementioned method, the value of the maximum size of the macroblock may be encoded through a value of $\log_2$ (the maximum size of the macroblock/the minimum size of the macroblock).

FIG. 1 is a block diagram schematically illustrating a video encoding apparatus according to a first exemplary embodiment of the present disclosure.

A video encoding apparatus 100 according to the first embodiment of the present disclosure includes an encoding information encoder 110 and an encoder 120. The encoding information encoder 110 encodes encoding information, such as macroblock information, prediction information, transform information, and residual signal information. Further, the encoding information encoder 110 may encode pixel information on an image itself.

Here, the macroblock information may include information, such as a maximum size of an available macroblock, a minimum size of an available macroblock, a size of a macroblock of a picture and an area to be currently encoded, and partition information of a macroblock.

Skip information may include information indicating whether a macroblock or a block is a skip macroblock, information on a size of subblocks within a skip block, and skip type information indicating specific information to be encoded within a skip block.

Prediction information may include a prediction type indicating whether a corresponding block is an intra block or an inter block, first partition information indicating a size and a shape of subblocks within a block for a prediction, intra prediction mode information, motion information including motion vector information and reference picture information, etc. Further, the motion information may include information, such as a skip motion vector for a motion estimation and a motion compensation of a skip block, a prediction direction of a motion vector, an optimum motion vector prediction candidate, a reference picture index, optimum motion vector precision, and the like.

The transform information may include information, such as a maximum size of an available transform, a minimum size of an available transform, second partition information indicating a size of a transform, transform type information indicating a transform used among various transforms, and the like. Here, the maximum size and the minimum size of the transform and a transform size of an area to be currently encoded may be determined by unit of total sequences, Group of Pictures (GOPs), pictures, or slices, and be included in a bitstream as header information, likewise to a macroblock. For example, the maximum size and the minimum size of an available transform and a size of a transform of a picture or an area to be currently encoded may be determined by unit of total sequences, Group of Pictures (GOPs), pictures, or slices, the maximum size and the minimum size of the transform may be encoded by inserting them in a bitstream as header information of a sequence, a GOP, a picture, a slice, etc., and the transform of the picture or area to be currently encoded may be used as a transform having a variable size by inserting a flag indicating the transform is partitioned from a transform having a maximum size in the bitstream. In this event, the maximum size and the minimum size of the transform may be determined by separately setting a horizontal size and a vertical size of the transform.

Further, hard sizes may be designated as the maximum size value and the minimum size value of the transform or a multiple by which the transform is to be expanded or downsized from a predetermined size may be transmitted. Further, a multiple by which a maximum size of the transform is expanded from a predetermined size may be encoded. In addition, a ratio of a horizontal size to a vertical size may be separately encoded.

Otherwise, after the value of the maximum size of the transform is encoded through the aforementioned method, the value of the minimum size of the transform may be encoded through a value of $\log_2$ (the maximum size of the transform/the minimum size of the transform) indicating a ratio of the minimum size of the transform to the maximum size of the transform. On the contrary, after the value of the minimum size of the transform is encoded through the aforementioned method, the value of the maximum size of the transform may be encoded through a value of $\log_2$ (the maximum size of the transform/the minimum size of the transform).

The residual signal information may include coded block information indicating whether a predetermined block includes a transform coefficient other than "0", a quantization matrix index, a delta quantization parameter, or transform coefficient information. The coded block information indicating whether transform coefficients other than "0" are included within predetermined blocks may be a flag having a length of 1 bit indicating whether the transform coefficients other than "0" are included within subblocks partitioned for a prediction or a transform. In this event, a flag for each of a block of a luminance component Y and blocks of chrominance components U and V may be encoded, and whether the transform coefficients other than "0" are included within the three blocks of the luminance component Y and the chrominance components U and V may be indicated through a single flag. Otherwise, after a flag indicating whether transform coefficients other than "0" are included in all three blocks of color components Y, U, and V is encoded, a type of transform is encoded only in the case where a transform coefficient other than "0" is included and then a flag indicating whether a transform coefficient other than "0" is included in subblocks of each color component may be encoded.

Further, the encoding information may contain information, such as information on an optimum interpolation filter for an area having a predetermined size and information on use or non-use of an image quality improvement filter.

The encoding information encoder 110 in the embodiment of the present disclosure encodes skip information indicating that a block to be encoded in an image corresponds to a skip block and encodes skip motion information of the block according to the skip information or encodes prediction information and transform information of the block, a Coded Block Pattern (CBP), a delta quantization parameter, transform coefficient information, etc.

The skip information refers to information indicating that a block is a skip block. That is, the skip information may indicate a skip block and a non-skip block. Here, the skip block means a mode which does not encode specific information including the first partition information, the second partition information, the motion information, and the transform coefficient.

The skip information may be implemented with a flag of 1 bit indicating that the block is the skip block or the non-skip block, but it is essentially not limited thereto, and may be implemented in other various methods.

For example, when a block of an input image to be currently encoded by the video encoding apparatus 100 is the skip block, only information indicating that the block is the skip block is encoded and the remaining block type, motion information, and the transform coefficient of the block may not be encoded. For another example, when a block of an input image to be currently encoded by the video encoding apparatus 100 is the skip block, only information indicating that the corresponding block is the skip block and motion information of the corresponding block are encoded, and the information, such as information on a block type and a transform coefficient of the corresponding block, may not be encoded.

For another example, when a block of an input image to be currently encoded by the video encoding apparatus 100 is the skip block, only information indicating that the corresponding block is the skip block and a transform type and a transform coefficient of the corresponding block are encoded, and information on a block type and motion information may not be encoded.

For another example, the types of information which are not transmitted may be different depending on a size of the skip block. For example, when a block to be currently encoded is 64×64 and the block is the skip block, only a transform coefficient may be encoded, and when a block to be currently encoded is 16×16 and the block is the skip block, only motion information may be encoded.

The prediction information means prediction type information indicating whether a corresponding block is an intra block or an inter block, first partition information indicating a size of subblocks within a block for a prediction, intra-prediction mode information according to the prediction type information, or motion information, such as a motion vector and a reference picture index.

The first partition information, which is information indicating a size and a shape of the subblocks within a block for a prediction, means information on whether the block is partitioned into smaller subblocks.

For example, when it is assumed that a block of an input image to be currently encoded by the video encoding apparatus 100 is a macroblock and the macroblock has a 64×64 pixel size, the macroblock having the 64×64 pixel size may be partitioned into subblocks having various sizes and in various numbers, such as two subblocks having a 64×32 pixel size, a single subblock having 64×32 pixel size and two subblocks 32×32 pixel size, or four subblocks having a 32×32 pixel size and predictive-encoded. The first partition information indicates whether to partition the macroblock into subblocks for a prediction. For example, the first partition information may be implemented with a partition flag, which is a flag of 1 bit, indicating whether to partition a block into subblocks or not, but it is not essentially limited thereto and may be implemented in various methods.

Here, when the partition flag of 1 bit indicates that the block is to be partitioned, the block is partitioned into a plurality of subblocks according to a predetermined method. For example, the block is partitioned into two or four subblocks having the same size.

For another example, the first partition information may indicate whether to partition a block into subblocks having a predetermined smaller size.

For example, when it is assumed that a block of an input image to be currently encoded by the video encoding apparatus 100 is a macroblock and the macroblock has a 64×64 pixel size, the macroblock having the 64×64 pixel size is partitioned into 16 subblocks having a 16×16 pixel size through a flag of 1 bit so that the predictive encoding is performed on the macroblock, or the predictive encoding is performed on the macroblock without the partitioning of the macroblock into the subblocks. In addition, the predictive encoding may be performed on the macroblock through the combination of the aforementioned two methods.

The skip motion information refers to a motion vector itself determined through estimation of a motion of a corresponding block or a differential vector between a motion vector of a corresponding block and a predicted motion vector of the corresponding vector and/or a reference picture index in the case where the corresponding block to be encoded is the skip block. That is, when the corresponding block to be encoded is the skip block, the video encoding apparatus 100 encodes only skip motion information, not residual signal information, and a video decoding apparatus to be described reconstructs the corresponding block by reconstructing the skip motion information and compensating for the motion of the corresponding block by using reconstructed skip motion information.

Further, the skip motion information may be optimum motion vector prediction candidate information or predicted motion vector information. That is, when the corresponding block is the skip block, the video encoding apparatus 100 encodes only the predicted motion vector information of the corresponding block and the video decoding apparatus to be described reconstructs the predicted motion vector information, determining the predicted motion vector by using reconstructed predicted motion vector information, and then performing a motion compensation by using the determined predicted motion vector. The predicted block obtained through the motion compensation becomes a reconstructed block.

Further, the video encoding apparatus 100 may apply a skip mode only in the case where the reference picture index is "0". Specifically, when it is determined that a target block to be currently encoded is a skip block, the video encoding apparatus 100 encodes a determined motion vector itself or a differential vector between a motion vector of the target block and a predicted motion vector of the target block, and the video decoding apparatus to be described reconstructs the target block by reconstructing the determined motion vector itself or the differential vector between the motion vector of the target block and the predicted motion vector of the target block and compensating for the motion of the target block by using the reference picture index "0" (i.e. an image reconstructed immediately prior to the current image is used as the reference picture).

Further, in the determination of the predicted motion vector of the block to be encoded, when at least one motion vector among motion vectors of an upper-side block and a left-side block of the block to be currently encoded is a zero-vector, i.e. {0,0}, the zero-vector may be used as the predicted motion vector in the motion estimation and compensation of the skip block. In other cases, a median of motion vectors of an upper-side block, a left-side block, and an upper-right-side block of the corresponding block is used as the predicted motion vector. When the block to be currently decoded corresponds to the skip block and a motion vector of an upper or left-side block is the zero-vector {0,0} in the determination of the predicted motion vector, the video decoding apparatus to be described reconstructs the corresponding block by using the zero-vector {0,0} as the predicted motion vector, reconstructing the reconstructed differential vector, and performing the motion compensation.

For an example of another implementation, a predicted motion vector may be differently used according to a block size. For example, for a block having a size larger than a 16×16 pixel size, a median vector is used as a predicted motion vector regardless of vector values of an upper-side block and a left-side block of a block to be currently encoded. For a block having a 16×16 pixel size, in the case where a vector value of an upper-side block or a left-side block of a block to be currently encoded is {0,0}, the zero-vector is used as a predicted motion vector. In other cases, a median vector among three motion vectors of a left-side block, an upper-side block, and an upper-left-side block is used as a predicted motion vector (a counter case thereof is also valid).

The prediction type information may be encoded by unit of macroblocks, and indicates a prediction type, i.e. prediction type I, prediction type P, prediction type B, or prediction type Direct, of a corresponding macroblock. For example, the prediction type information may be implemented with a block type flag of 1 bit indicating whether a macroblock is the inter macroblock or the intra macroblock. Further, the prediction type information may be encoded for each predetermined size, i.e. a 16×16 pixel size, and in this event, all prediction types of subblocks within a block having the predetermined size are the same. For example, when the prediction type information is encoded by unit of blocks having a 16×16 pixel size and the prediction type information of the currently encoded block having the 16×16 pixel size indicates the intra prediction, it is indicated that all subblocks within the currently encoded block having the 16×16 pixel size have been predictive-encoded using the intra prediction.

The first partition information refers to information indicating a size and a shape of subblocks for prediction of the corresponding block when the corresponding block to be encoded is not a skip block. For example, the first partition information may be indicated with partition type information indicating a form by which a corresponding block has been partitioned into subblocks, such as a corresponding block has been not partitioned, a corresponding block has been partitioned into two horizontally long subblocks, a corresponding block has been partitioned into two vertically long subblocks, or a corresponding block has been partitioned into four subblocks.

For another example, a skip flag indicating whether a macroblock is a skip macroblock is encoded, and when the macroblock is not the skip macroblock, the prediction information is encoded. The prediction information may be implemented while containing the prediction type flag of 1 bit indicating whether the corresponding macroblock is the inter macroblock or the intra macroblock and the partition type information indicating a partition type by which a corresponding macroblock is partitioned into subblocks.

For still another example, the prediction type flag of 1 bit indicating whether the corresponding macroblock is the inter macroblock or the intra macroblock and the partition type information indicating that a partition type by which the corresponding macroblock is partitioned into subblocks may be encoded and a skip subblock flag of 1 bit indicating whether each subblock is the skip block may be then encoded as the prediction information. Here, the skip subblock flag indicates whether each subblock of the corresponding block is in the skip mode, and indicates that the corresponding subblock is skipped without being encoded when a specific subblock is the skip block. Specifically, when a specific subblock among subblocks of a block to be encoded is the skip block, the motion information or the residual signal information of the specific subblock is not encoded.

For yet still another example, when the skip flag indicating whether the macroblock is the skip macroblock is encoded and when the macroblock is not the skip macroblock, the prediction type flag of 1 bit indicating whether the corresponding macroblock is the inter macroblock or the intra macroblock and the partition type information indicating that a partition type by which the corresponding macroblock is partitioned into subblocks may be encoded and the skip subblock flag of 1 bit indicating whether each subblock is the skip block may be then encoded as the prediction information. Here, the skip subblock flag indicates whether each subblock of the corresponding block is in the skip mode, and indicates that the corresponding subblock is skipped without being encoded when a specific subblock is the skip block. Specifically, when a specific subblock among subblocks of a block to be encoded is the skip block, the motion information or the residual signal information of the specific subblock is not encoded.

Further, the partition type may be differently used according to the prediction type of the block.

Further, the prediction type and the partition type of the block may be encoded, respectively, and all available combinations of the prediction type and the partition type may be made up with one or more tables and codewords of the tables may be encoded.

The transform information may contain information, such as the second partition information indicating a size of the transform and the transform type information indicating a type of transform used among various transforms.

The second partition information refers to information on a transform unit for which a transform and a quantization are performed when the block to be encoded or each subblock of the corresponding block is transformed and quantized. For example, when a block having a 64×64 pixel size is encoded without being partitioned any longer and it is determined that a 16×16 transform is efficient, information indicating that the 16×16 transform has been used may be encoded as the second partition information. The second partition information may be implemented in a similar manner to the first partition information. That is, the second partition information may be implemented with the partition flag of 1 bit indicating that the current block has been partitioned into subblocks for the transform. When the partition flag of 1 bit indicates that the current block is to be partitioned into subblocks, the current block is partitioned into a plurality of subblocks for the transform according to a predetermined method. For example, the current block is partitioned into two or four subblocks having the same size.

The transform type information indicates a type of transform, such as a cosine transform, a sine transform, Hadamard transform.

The coded block pattern refers to information indicating whether coefficients of respective subblocks of the block to be encoded or the corresponding block are all "0". The delta quantization parameter refers to information indicating a quantization parameter for each subblock of the block to be encoded or the corresponding block.

The aforementioned information, such as the skip flag, skip type, prediction type, first partition information, intra prediction mode, motion information, second partition information, transform type information, block pattern, delta quantization parameter, and the transform coefficient may be determined by analyzing the input image by the encoding information encoder 110, but may be determined by analyzing the input image by the video encoder 120.

The video encoder 120 encodes the residual signal information of the block based on the skip information, the prediction information, and the transform information. For example, when the skip information indicates that the block to be encoded is not the skip block, the video encoder 120 encodes the residual signal information of the corresponding block by performing the intra-predictive encoding or the inter-predictive encoding on each subblock according to the prediction information of the block. Here, the residual signal information refers to information on a quantized transform coefficient generated by predicting a luminance component and/or a chrominance component of the block to be encoded in the image and transforming and quantizing a residual block. The residual signal information is encoded and then contained in the bitstream as texture data.

To this end, the video encoder 120 may include a predictor, a subtracter, a transformer and quantizer, an encoder, an inverse transformer and inverse quantizer, an adder, a filter, and a picture buffer.

The predictor may include an intra predictor and an inter predictor, and the inter predictor may include a motion estimator and a motion compensator.

The input image which is one picture or frame of an image is partitioned into macroblocks with an M×N pixel size (here, M and N may be integers equal to or larger than 16), each partitioned macroblock is input to the video encoding apparatus of FIG. 1. For example, when the input image has the 4:2:0 format, the macroblock is configured with a luminance block having the M×N pixel size and a chrominance block having (M/2)×(N/2) pixel size.

Figure 2:
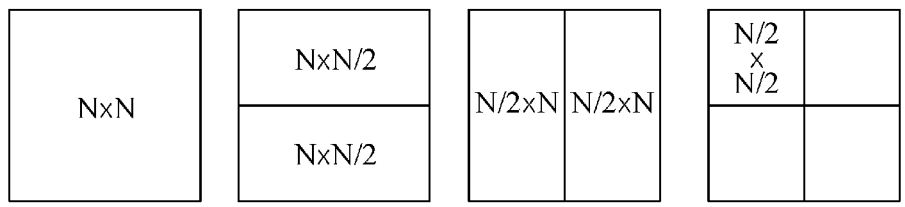
FIG. 2 is an example of various sizes of macroblocks and subblocks for an intra-predictive encoding and an inter-predictive encoding according to a first exemplary embodiment of the present disclosure.
Figure 2:
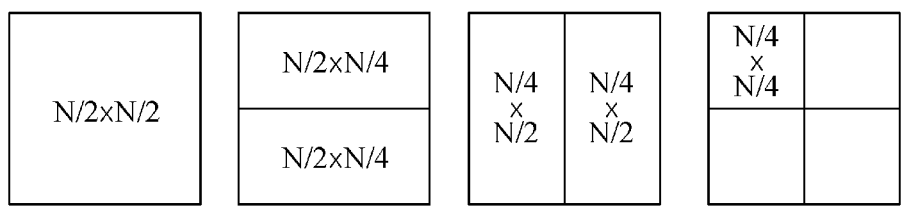
Figure 2:
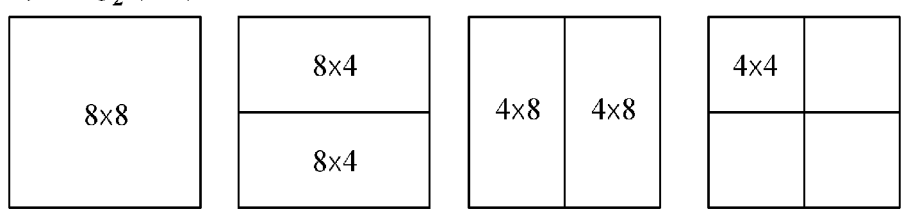

In the present embodiment of the present disclosure, each macroblock is internally partitioned into smaller subblocks as illustrated in FIG. 2, so that the inter prediction encoding or the inter prediction encoding is performed.

FIG. 2 illustrates an example of various sizes of macroblocks and subblocks for the intra-predictive encoding and the inter-predictive encoding according to at least one embodiment of the present disclosure.

FIG. 2 illustrates an example of macroblocks and subblocks on an assumption that M and N have the same size, N is an integer equal to or larger than 16, and a size of a minimum block is 4×4. When the macroblock is a block having the 64×64 pixel size, the subblocks, i.e. the subblock having the 64×64 pixel size, the subblocks having the 64×32 pixel size, the subblocks having the 32×64 pixel size, and the subblocks having the 32×32 pixel size, are included in macroblock layer 0, and the subblocks, i.e. the subblock having the 32×32 pixel size, the subblocks having the 32×16 pixel size, the subblocks having the 16×32 pixel size, and the subblocks having the 16×16 pixel size, are included in macroblock layer 1. Here, only when the largest subblock among the subblocks of macroblock layer K $$\left(\text{only when } 0 \le K \le \log_2 \frac{N}{4}\right)$$

is partitioned into four blocks, subblocks of macroblock layer K+1 may be used.

The video encoding apparatus may calculate the encoding efficiency in the case where the macroblock is encoded with the respective subblocks and determine the subblock having the highest encoding efficiency as a final intra prediction block or a final inter prediction block. The encoding efficiency may be measured based on a Rate-Distortion Optimization (RDO) method.

A size of the minimum block may be determined according to a maximum layer value (MaxLayer) which is a value of an available maximum layer. For example, in the case of the macroblock having M×N pixel size, the size of the minimum block may be determined as $N/(2^{MaxLayer})$.

Figure 3:
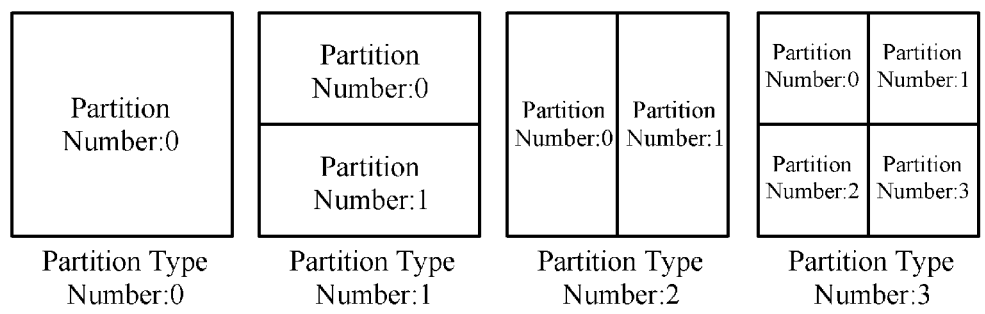
FIG. 3 is partition type numbers according to a first exemplary embodiment of the present disclosure.

FIG. 3 illustrates partition type numbers according to the first exemplary embodiment of the present disclosure. The partition type number may be used as the macroblock partition information, the first partition information indicating a size and a shape of subblocks for the prediction, and the second partition information indicating a size of the transform.

For example, in the case where an available macroblock having the largest size is partitioned into macroblocks for an area to be currently encoded, when the block having $$\frac{N}{2^K} \times \frac{N}{2^K}$$

pixel size of the macroblock layer K is not partitioned into smaller subblocks any longer, partition type number "0" is allocated to the block having $$\frac{N}{2^K} \times \frac{N}{2^K}$$

pixel size of the macroblock layer K, when the block having $$\frac{N}{2^K} \times \frac{N}{2^K}$$

pixel size of the macroblock layer K is partitioned into two blocks having $$\frac{N}{2^K} \times \frac{N}{2^{K+1}}$$

pixel size, partition type number "1" is allocated to the block having $$\frac{N}{2^K} \times \frac{N}{2^K}$$

pixel size of the macroblock layer K, when the block having $$\frac{N}{2^K} \times \frac{N}{2^K}$$

pixel size of the macroblock layer K is partitioned into two blocks having $$\frac{N}{2^{K+1}} \times \frac{N}{2^K}$$

pixel size, partition type number "2" is allocated to the block having $$\frac{N}{2^K} \times \frac{N}{2^K}$$

pixel size of the macroblock layer K, and when the block having $$\frac{N}{2^K} \times \frac{N}{2^K}$$

pixel size of the macroblock layer K is partitioned into four blocks having $$\frac{N}{2^{K+1}} \times \frac{N}{2^{K+1}}$$

pixel size, partition type number "3" is allocated to the block having $$\frac{N}{2^K} \times \frac{N}{2^K}$$

pixel size of the macroblock layer K. In FIG. 3, the numbers 0, 1, 2, and 3 indicated in the respective partitioned subblocks within the block having $$\frac{N}{2^K} \times \frac{N}{2^K}$$

pixel size of the macroblock layer K are partition numbers for identifying each subblock.

Figure 4:
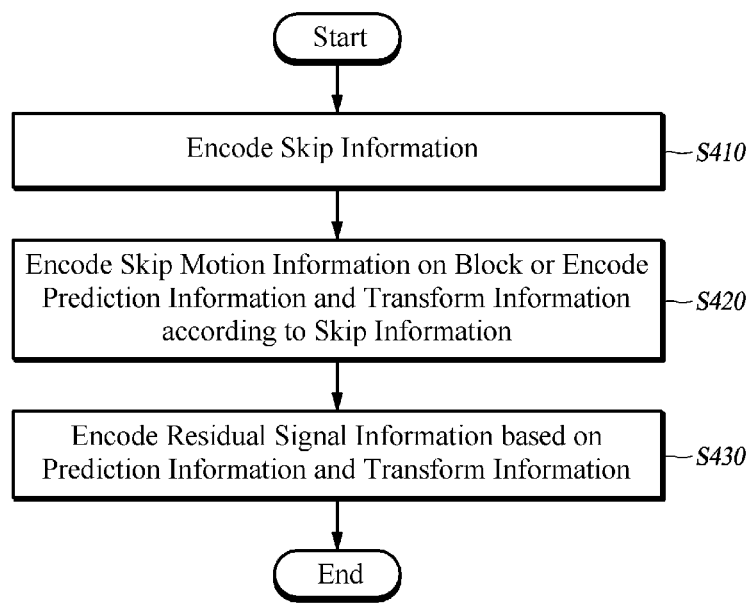
FIG. 4 is a flowchart of a video encoding method according to a first exemplary embodiment of the present disclosure.

FIG. 4 is a flowchart illustrating a video encoding method according to the first exemplary embodiment of the present disclosure.

According to the video encoding method according to the first embodiment of the present disclosure, the video encoding apparatus 100 encodes a skip flag indicating whether a block to be encoded is a skip block and skip information containing the skip type (S410). For example, the video encoding apparatus 100 encodes information indicating whether a current block is the skip block and determines whether the current block is the skip block in which only residual signal information of the block is encoded or the skip block in which only motion information of the block is encoded without encoding the residual signal information of the block. The video encoding apparatus 100 encodes the skip information indicating that the current block is the skip block when the current block is the skip block in which only the motion information of the block is encoded, and encodes the skip information indicating that the current block is not the skip block when not only the motion information of the block but also the residual signal information are encoded.

The video encoding apparatus 100 encodes the skip motion information of the block according to the skip information or encodes the intra or inter prediction information and the transform information (S420), and encodes the residual signal information of the block based on the prediction information and the transform information (S430). That is, the video encoding apparatus 100 encodes the block with different methods according to the skip information indicating whether the block to be encoded is the skip block.

Hereinafter, an example of processes of steps S420 and S430 performed by the video encoding apparatus will be described based on an assumption that the block to be encoded is the macroblock having a 64×64 pixel size.

In step S420, when the skip information indicates that the block is the skip block, the video encoding apparatus 100 may encode a skip motion vector for the block. Specifically, the video encoding apparatus 100 estimates motion by unit of 64×64 pixel sizes for the block to be encoded, searches for a reference block which is the most similar block to the block to be encoded in a reference picture, determines a motion vector indicating a relative position between the reference block and the block to be encoded as the skip motion vector, determines a reference picture index indicating the reference picture including the reference block as a skip reference picture index, and encodes the skip motion information including the skip motion vector and the skip reference picture index.

Further, when the block is the skip block, the video encoding apparatus 100 may perform the encoding by partitioning the block into smaller subblocks. It means that all subblocks within the skip block are the skip subblocks, and when the skip block is partitioned into the smaller subblocks, the video encoding apparatus 100 may encode the first partition information indicating the size of the subblocks within the skip block and the skip motion information of each subblock. In this event, the skip motion information in the number corresponding to the number of the subblocks is encoded.

In steps S420 and S430, when the skip information indicates that the block to be currently encoded is not the skip block, the video encoding apparatus 100 may encode the intra or inter prediction information and the transform information for the block to be encoded. Specifically, the video encoding apparatus 100 encodes the prediction type information indicating whether the block to be encoded is the intra block or the inter block, and encodes the first partition information indicating the size of the subblocks within the block for the inter prediction when the block to be encoded is the inter block. That is, when a block type of the subblock of the block to be encoded is the inter block, the video encoding apparatus 100 may partition the block to be encoded into the subblocks having the 6×16, 16×8, 8×16, or 8×8 pixel size, and the video encoding apparatus 100 may partition each subblock having the 8×8 pixel size into smaller subblocks having the 8×8, 8×4, 8×4, or 4×4 pixel size when the subblock having the 16×16 pixel size is partitioned into four subblocks having the 8×8 pixel size. When the macroblock having the 64×64 pixel size is not partitioned into smaller subblocks any longer and the inter prediction is performed by unit of macroblocks, the video encoding apparatus 100 searches for the reference block which is the most similar to the block to be encoded by estimating the motion of the block by unit of 64×64 pixels, determines the motion vector indicating the relative position between the reference block and the block to be encoded, determines the reference picture index indicating the reference picture including the reference block, and encodes the residual signal information obtained by transforming and quantizing the residual block which is a difference between a predicted block generated by compensating for the motion of the block to be encoded based on the determined motion vector and the block to be encoded, and also encodes the partition information and the transform information used for the predictive encoding.

If the prediction type of the block to be encoded indicates the intra prediction, the video encoding apparatus 100 determines an intra prediction mode of a corresponding subblock, performs the predictive encoding based on the determined intra prediction mode, and encodes the residual signal information and the prediction information.

Here, the first partition information indicating the size of the subblock within the block for the prediction may be indicated using the partition type numbers illustrated in FIG. 3, and the types of available partition type number may be differentiated depending on whether the block is the inter macroblock or the intra macroblock. For example, when the prediction type of the block is the intra prediction mode, only partition type numbers 0 and 3 of FIG. 3 may be used, and when the prediction type of the block is the inter prediction mode, all partition type numbers 0, 1, 2, and 3 of FIG. 3 may be used.

The transform information may additionally contain at least one of the second partition information indicating a size of the transform and the transform type information. Here, the second partition information may be indicated using the partition type numbers illustrated in FIG. 3 identically to the first partition information, and the types of available partition type number may be differentiated depending on whether the block is the inter macroblock or the intra macroblock.

Further, when the skip information indicates that the block to be encoded is not the skip block, the video encoding apparatus 100 encodes the prediction type information and the first partition information, and when the prediction type information indicates the inter prediction, the prediction type information may additionally contain the skip information indicating whether the respective subblocks within the block according to the first partition information are the skip subblocks.

In step S420, when the video encoding apparatus 100 encodes the first partition information or the second partition information, the video encoding apparatus 100 may encode the partition information by using a tree structure. For example, in encoding the partition information, the video encoding apparatus 100 may group a plurality of subblocks in each predetermined area, repeat a process of allocating a minimum value among the partition information of the grouped subblocks included in said each predetermined area in each layer as the partition information of said each predetermined area up to the highest layer, and then encode a difference value between the partition information of the subblocks in said each predetermined area of each layer and partition information of subblocks in each predetermined area of a higher layer thereof. A method of encoding using the partition type numbers of FIG. 3 as the partition information will be described in a process to be described with reference to FIGS. 6 and 7.

FIGS. 5A and 5B illustrate examples of a syntax structure of an encoded bitstream according to the first exemplary embodiment of the present disclosure.

When the video encoding apparatus 100 encodes the block to be encoded in the input image according to the method of encoding the video according to the first embodiment of the present disclosure, the bitstream having a syntax structure illustrated in FIG. 5 may be generated. FIG. 5 illustrates the bitstream for the block to be encoded.

FIG. 5A illustrates the syntax structure of the bitstream when the block to be encoded is the skip block. When the block to be encoded is the skip block, the bitstream generated by encoding the corresponding block may include a skip information field, a first partition information field, and a skip motion information field. Skip information-encoded data is allocated to the skip information field, first partition information-encoded data is allocated to the first partition information field, and skip motion information-encoded data is allocated to the skip motion information field.

FIG. 5B illustrates the syntax structure of the bitstream when the block to be encoded is not the skip block. The bitstream generated by encoding the corresponding block may include the skip information field, a prediction type field, the first partition information field, an intra prediction mode information field or a motion information field, a transform information field, a CBP information field, delta QP, and residual signal information field. Here, a CPB information field, a transform type information field, and a delta QP field are not necessarily included in the bitstream, and some or all thereof may be included in the bitstream depending on an implementation method.

When the encoding information encoder 110 according to the first embodiment of the present disclosure encodes or decodes the image, the encoding information encoder 110 according to the first embodiment of the present disclosure improves the encoding efficiency by encoding and decoding the image by using information (e.g. the partition information) to be encoded on the image.

The encoding method and the decoding method using the tree structure in the embodiment of the present disclosure may be applied to the entropy encoding and the entropy decoding, but they are not essentially limited thereto, and may be applied to other various types of encoding and decoding.

The encoding information encoder 110 groups the predetermined number of areas containing information on an image to be encoded into a plurality of groups, generates a node value by repeating a process of determining a minimum value or a maximum value of information on grouped areas to be encoded in each layer as information on a group including the grouped areas up to the highest layer, and encodes a difference value between the node value for each layer and a node value of a higher layer thereof or a difference value between the node value for each layer and a value determined according to a predetermined criterion.

Further, the predetermined area may be a macroblock with a variable size, a block having various sizes, such as a block having a 64×64 pixel size, a block having a 32×32 pixel size, a block having a 16×16 pixel size, a block having a 16×32 pixel size, and a block having a 4×16 pixel size, or an area having various shapes and sizes, such as a block for determination of the motion vector.

Here, encoding information encoder 110 may perform the encoding by using a value of data to be encoded as it is or by allocating an encoding number to the data to be encoded. A method of allocating the encoding number may be variously changed according to a generation probability of the data.

Further, the node value for each layer refers to a value of information on a group including grouped areas. For example, the node value may be a value of information on a predetermined area in the lowest layer and a value of information on a group including multiple predetermined areas in a higher layer of the lowest layer. The value of the information on the group including the predetermined areas may be determined as a minimum value or a maximum value among values of information on the predetermined areas included in the group. Further, the value determined in accordance with the predetermined criterion may be a value having the highest generation probability of the information in a previous area or an area which has been encoded so far in neighboring areas, but it is not essentially limited thereto, and the value may be determined according to various references.

In this event, the encoding information encoder 110 may encode the difference value between the node value for each layer and the node value of the higher layer by using various binary coding methods, such as a unary code, a truncated unary code, and an exponential-Golomb code. Further, after a tree encoder 120 performs a binary coding on the difference value between the node value for each layer and the node value of the higher layer in the binary coding method, such as the unary code, the truncated unary code, and the exponential-Golomb code, the tree encoder 120 may perform a binary arithmetic coding by determining a probabilistic model for the encoding of the node value of the layer to be encoded based on node values of a neighboring layer or a higher layer or changing the probabilistic models for respective layers.

Further, when the encoding information encoder 110 determines the minimum value among the node values of the lower layer as the node value for each layer, the encoding information encoder 110 skips the encoding of the node value of the lower layer of a layer having a maximum node value. That is, in the case where the tree encoder 120 determines the minimum value among the node values of the lower layer as the node value for each layer, when a specific node value of a specific layer is the maximum value of the information to be encoded, the tree encoder 120 encodes the specific node value of the corresponding layer and does not encode the node values of the lower layer of the corresponding layer on an assumption that all the node values of the lower layer of the corresponding layer have the same value. On the contrary, when the tree encoder 120 determines the maximum value among the node values of the lower layer as the node value for each layer, the tree encoder 120 skips the encoding of the node value of the lower layer of a layer having the minimum node value. Specifically, in the case where the encoding information encoder 110 determines the maximum value among the node values of the lower layer as the node value for each layer, when a specific node value of a specific layer is the minimum value of the information to be encoded, the encoding information encoder 110 encodes the specific node value of the corresponding layer and does not encode the node values of the lower layer of the corresponding layer on an assumption that all the node values of the lower layer of the corresponding layer have the same value.

Further, the encoding information encoder 110 may change a code number allocated to information to be encoded for the encoding according to the generation probability of information to be encoded and allocate a smaller code number or a larger code number to information to be encoded according to the generation probability of information. In this event, the generation probability of the information to be encoded may be calculated using various generation probabilities, such as a generation probability of information on a predetermined neighboring area or a generation probability of information on an area encoded so far within all or some areas including information to be encoded.

When the encoding information encoder 110 encodes the node value of the highest layer, there is no higher layer of the highest layer, so that the encoding information encoder 110 may set a predetermined value to a node value of a higher layer of the highest layer and encode a difference value between the node value of the highest layer and the set predetermined value. Here, the predetermined value set as the node value of the higher layer of the highest layer may be set to various values, such as a value of information on an area having the highest generation probability of information encoded so far within all or some areas including information to be encoded, a preset value, and a value of information on an area having the highest generation probability of information among values of information on predetermined neighboring areas.

The encoding information encoder 110 encodes side information used for the encoding of information on a predetermined area by using the tree structure according to the first exemplary embodiment of the present disclosure. Here, the side information may be information, such as information on the maximum number of layers, information on a size of an area of each node of the lowest layer, information indicating the tree structure, and information indicating whether to determine a minimum value or a maximum value among node values of a lower layer as a node value for each layer. The encoded side information may be included in a header of a predetermined encoding unit, such as a header of a sequence, a header of a picture, or a header of a slice, of the bitstream.

Here, the information for indicating the tree structure may be a flag having a length of 1 bit indicating whether a current node is partitioned into nodes of a lower layer, or a syntax having a length of two bits or more.

For example, when a bit value is "1", it indicates that a corresponding node is partitioned into nodes of a lower layer, and a block of a current layer is partitioned into four sub-blocks. That is, four lower nodes for the current node are generated. When a bit value is "0", it indicates that the corresponding node is not partitioned into the nodes of the lower layer. Whether the corresponding node is partitioned into nodes of a lower layer of the current node is not encoded in a node of the lowest layer, but the information to be encoded, which is the node value of the corresponding node, is encoded.

In the aforementioned example, a case of the non-partition of the current node and a case of the partition of the current node into the four nodes of the lower layer are indicated using the flag having the length of 1 bit. However, the tree structure using the syntax having the length of two or more bits may be used so as to indicate various forms of the partition of the current node into the nodes of the lower layer, such as non-partition of the current node into the nodes of the lower layer, the partition of the current node into two horizontally long nodes of the lower layer, the partition of the current node into two vertically long nodes of the lower layer, the partition of the current node into four nodes of the lower layer.

Hereinafter, an example of the encoding of the partition information by using the tree structure will be described with reference to FIGS. 6A to 7.

FIGS. 6A to 6D illustrate the partition information for each layer obtained by grouping partition information of sub-blocks of a block to be encoded in each predetermined area in order to encode the partition type information by using the tree structure.

FIG. 6A illustrates the subblocks included in the block to be encoded and the partition information of the respective subblocks. In FIG. 6A, Mx(a, b) indicates the partition information of a subblock corresponding to position (a, b) within the block to be encoded. Specifically, Mx(0, 0) indicates the partition information of a subblock (i.e. the first subblock within the block to be encoded in a raster scan direction) corresponding to position (0, 0) within the block to be encoded, and Mx(0, 1) indicates the partition information of a subblock (i.e. the second subblock within the block to be encoded in the raster scan direction) corresponding to position (0, 1) within the block to be encoded.

The partition information of the respective subblocks illustrated in FIG. 6A is grouped in each predetermined area (e.g. in said each predetermined area including two or more sub-blocks), and a minimum value among the partition information of the grouped subblocks included in said each predetermined area is selected and the selected minimum value is allocated as the partition information of the subblocks in said each predetermined area.

FIG. 6B illustrates a result of allocating a minimum value as the partition information of said each predetermined area including the grouped subblocks by grouping the partition information of the subblocks illustrated in FIG. 6A. For example, the areas including the subblocks (0,0), (0,1), (1,0), and (1,1) illustrated in FIG. 6A are set to and grouped in each predetermined area, a minimum value among the partition information $M_X(0,0)$, $M_X(0,1)$, $M_X(1,0)$, and $M_X(1,1)$ on the respective subblocks included in said each predetermined area is selected, and the selected minimum value is allocated as the partition information of said each predetermined area $M_{X-1}(0,0)$. Again, the areas including the subblocks (0,2), (0,3), (1,2), and (1,3) are set to and grouped in said each predetermined area, a minimum value among the partition information $M_X(0,2)$, $M_X(0,3)$, $M_X(1,2)$, and $M_X(1,3)$ on the respective subblocks included in said predetermined area is selected, and the selected minimum value is allocated as the partition information of said predetermined area $M_{X-1}(0,1)$. The aforementioned process is applied to the remaining subblocks in the same manner. When a process of allocating the partition information of the subblocks illustrated in FIG. 6A as the partition information of said predetermined area illustrated in FIG. 6B is repeated from layers $M_{X-2}$, $M_{X-3}$, and . . . , up to layer $M_1$, the partition information may be allocated to each group including the said predetermined areas illustrated in FIG. 6C, and when the process is repeated up to layer $M_0$ again, the subblocks may be grouped such that a single group including said each group has the partition information as illustrated in FIG. 6D.

In FIGS. 6A to 6D, the description has been made based on an example in which four neighboring adjacent subblocks are set to and grouped in said each the predetermined area, but said predetermined area is not essentially limited thereto, and the subblocks may be grouped in each predetermined area in various methods, such as each predetermined area including eight neighboring adjacent subblocks and each predetermined area including non-adjacent six subblocks, and the partition information may be allocated to said each predetermined area.

Figure 7:
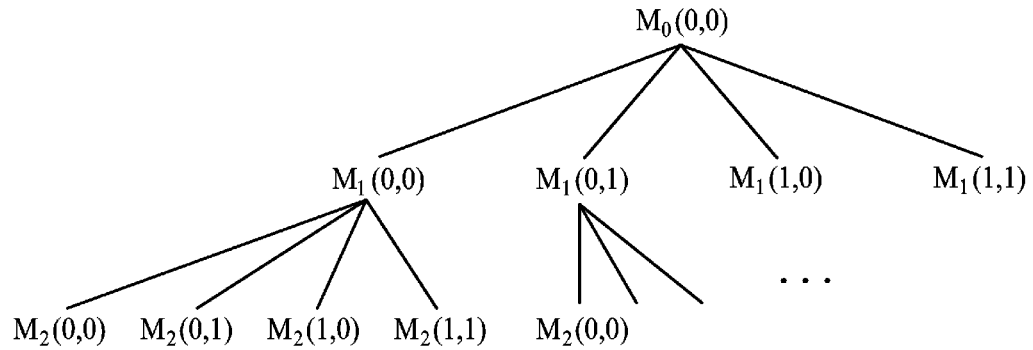
FIG. 7 is an example in which the process from FIG. 6A to 6D is expressed in a tree structure.

The allocation of the partition information of the subblocks included in the block to be encoded as the partition information of said each predetermined area illustrated in FIGS. 6A to 6D may be expressed in the tree structure illustrated in FIG. 7.

FIG. 7 illustrates an example in which the partition information of said each predetermined area for each layer is expressed in the tree structure. When it is assumed that the partition information of said each predetermined area is a node value, each node value of the tree structure illustrated in FIG. 7 may be encoded by encoding a difference value between the node value and a node value of a higher node thereof.

In a method of encoding a difference value between a node value of a node to be encoded and a node value of a higher node, binary bit "0" in a number corresponding to the difference value is encoded and binary bit "1" is finally encoded. When a difference between a node value of a layer node to be currently encoded and a node value of a higher node is "0", binary bit "1" is encoded. For example, the arithmetic coding method may be used for encoding the binary bit "0" and "1", and in this event different contexts may be used for each layer.

When the partition information, i.e. the node value, is encoded using the tree structure as described above, a node value of the highest node (hereinafter, referred to as "a highest node value") may be encoded in three types of examples to be described. For example, the highest node value may be encoded by encoding a difference value between the highest node value and "0" by using the binary bits "0" and "1" as described above. For another example, when the partition type number is set to the partition information and a large partition type number is set in a higher order of a generation frequency of the partition type, the highest node value may be encoded by encoding a difference value between the highest node value and the largest partition type number by using the binary bits "0" and "1" as described above. For still another example, when the partition type number is set to the partition information and a small partition type number is set in a higher order of the generation frequency of the partition type, the highest node value may be encoded by encoding a difference value between the highest node value and the smallest partition type number by using the binary bit "0" and "1".

The remaining node values other than the highest node value may be encoded by encoding a difference value between the node value of the node to be encoded and a node value of a higher layer of the corresponding node by using the binary bit "0" and "1". That is, each node value may be encoded by encoding the binary bit "0" in a number corresponding to the difference value and finally encoding the binary bit "1". When the difference between the node value of the node to be encoded and the node value of the higher layer is "0", the binary bit "1" is encoded. On the contrary, each node value may be encoded by encoding the binary bit "1" in a number corresponding to the difference value and finally encoding the binary bit "0", and in this event when the difference between the node value of the node to be encoded and the node value of the higher layer is "0", the binary bit "0" is encoded.

However, when the value of the higher node is the maximum value among the available partition type numbers in encoding each node value, the node values of the lower nodes of the corresponding higher node are not encoded. For example, when the node value of the node $M_1(0,0)$ is 3, the node values of the nodes $M_2(0,0)$, $M_2(0,1)$, $M_2(1,0)$, and $M_2(1,1)$ which are the lower nodes of the node $M_1(0,0)$ are not encoded. That is, since $M_1(0,0)$ has the minimum value among $M_2(0,0)$, $M_2(0,1)$, $M_2(1,0)$, and $M_2(1,1)$, all of $M_2(0,0)$, $M_2(0,1)$, $M_2(1,0)$, and $M_2(1,1)$ have the value of 3 or larger. However, since the maximum value of the partition information is 3 in FIG. 7, $M_2(0,0)$, $M_2(0,1)$, $M_2(1,0)$, and $M_2(1,1)$ may not have a value other than 3, it is not necessary to perform the encoding.

Further, in encoding the difference value between the value of the node to be encoded and the node value of the higher node, when the node value of the node to be encoded is the maximum value among the available partition type numbers, only the binary bit "0" in a number corresponding to the difference value is encoded, and the binary bit "1" is not finally encoded. For example, when it is assumed that the node value $M_1(0,0)$ of the higher node of the node to be encoded is "1" and the node values $M_2(0,0)$, $M_2(0,1)$, $M_2(1,0)$, and $M_2(1,1)$ of the nodes to be encoded are 2, 3, 3, and 2, respectively, the node values $M_2(0,0)$ and $M_2(1,1)$ are encoded by encoding a binary bit "01" and the node values $M_2(0,1)$ and $M_2(1,0)$ are encoded by encoding a binary bit "00", not "001".

Further, in the case where a node value of a last node among nodes having the same higher node is encoded, when all the node values of the nodes other than the last node are higher than the node value of the higher layer, the node value of the last node is not encoded. For example, when it is assumed that the node value $M_1(0,0)$ of the higher node of the node to be encoded is "1" and the node values $M_2(0,0)$, $M_2(0,1)$, $M_2(1,$ 0), and $M_2(1,1)$ of the nodes to be encoded are 2, 3, 3, and 1, respectively, the node values $M_2(0,0)$, $M_2(0,1)$, and $M_2(1,0)$ are all higher than the node value $M_1(0,0)$, so that the node value $M_2(1,1)$ of the last node is not encoded.

In the meantime, the remaining node values other than the highest node may be encoded by encoding the difference value of the node value of the node to be encoded and the node value of the higher layer of the corresponding node by using the binary bit "0" and "1". On the contrary, the remaining node values other than the highest node may be encoded by encoding the difference value between the node value of each node and the partition information having the highest generation frequency of the partition type (here, the partition information having the highest generation frequency of the partition type may have a fixed value or a non-fixed value. When the partition information having the highest generation frequency of the partition type has a non-fixed value, the partition information having the highest generation frequency of the partition type may be encoded and then transmitted to a decoder or not. When the partition information having the highest generation frequency of the partition type is not transmitted to the decoder, a node having the highest generation frequency of the partition type so far may be used by accumulating statistics of the blocks previously encoded before the current block.) In another embodiment in which the partition type information is encoded using the tree structure, in the case where a large partition type number is set in a higher order of the generation frequency of the partition type when the partition information of said each predetermined area of FIG. 6B is set by grouping the partition information of the subblocks illustrated in FIG. 6A, the maximum value among the values of the respective subblocks included in said each predetermined area may be used as the partition information of said each predetermined area.

Figure 8:
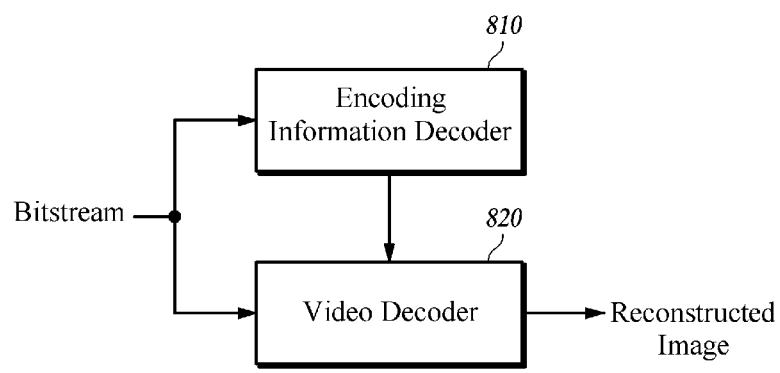
FIG. 8 is a block diagram of a video decoding apparatus according to a first exemplary embodiment of the present disclosure.

FIG. 8 is a block diagram schematically illustrating the video decoding apparatus according to the first exemplary embodiment of the present disclosure.

The video decoding apparatus 800 according to the first exemplary embodiment of the present disclosure may include an encoding information decoder 810 and a video decoder 820.

The encoding information decoder 810 reconstructs the encoding information, such as the aforementioned skip information, prediction information, transform information, and residual signal information, by decoding the bitstream. Further, the encoding information decoder 810 may decode the pixel information itself of the image.

The encoding information decoder 810 in the present embodiment of the present disclosure reconstructs the skip information indicating whether the block to be decoded in the image is the skip block by decoding the bitstream, and reconstructs the skip motion information of the block or reconstructs the intra or inter prediction information and the transform information of the block by decoding the bitstream according to the skip information.

For example, in the decoding of the bitstream having the syntax structure illustrated in FIGS. 5A and 5B by the encoding information decoder 810, the encoding information decoder 810 first reconstructs the skip information by extracting the data allocated to the skip information field from the bitstream and decoding the extracted data, and reconstructs the skip motion information by extracting the first partition information and the data allocated to the skip motion information field illustrated in FIG. 5A from the bitstream and decoding the extracted information and data, or reconstructs the prediction information, such as the prediction type, the first partition information indicating the size of the subblock within the block for the prediction, the intra prediction mode information or the motion information, the transform size and type information, the CBP information, and the delta QP, by extracting the data allocated to the prediction type field, the first partition information field, the intra prediction mode information field or the motion information field, the transform information field, the CBP field, and the delta QP field illustrated in FIG. 5B from the bitstream and decoding the extracted data, in accordance with the reconstructed skip information.

The video decoder 820 reconstructs the block based on the skip motion information or reconstructs the block by decoding the residual signal information reconstructed by decoding the bitstream based on the prediction information and the transform information.

For example, when the skip motion information is reconstructed by the encoding information decoder 810, the video decoder 820 reconstructs a block generated by compensating for the motion of each subblock of a block to be decoded or the corresponding block as a block to be decoded by using the reconstructed skip motion information. When the prediction information is reconstructed by the encoding information decoder 810, the video decoder 820 reconstructs the block to be decoded by generating a predicted block by performing the intra prediction or the inter prediction on each subblock of the block to be decoded or the corresponding block by using the reconstructed prediction information, reconstructing the transform information and the residual signal information by decoding the bitstream, and adding the residual block according to the reconstructed residual signal information and the predicted block.

To this end, the video decoder 820 may include a decoder, an inverse quantizer and inverse transformer, a predictor, an adder, a filter, and a picture buffer. The predictor may include a motion compensator.

Figure 9:
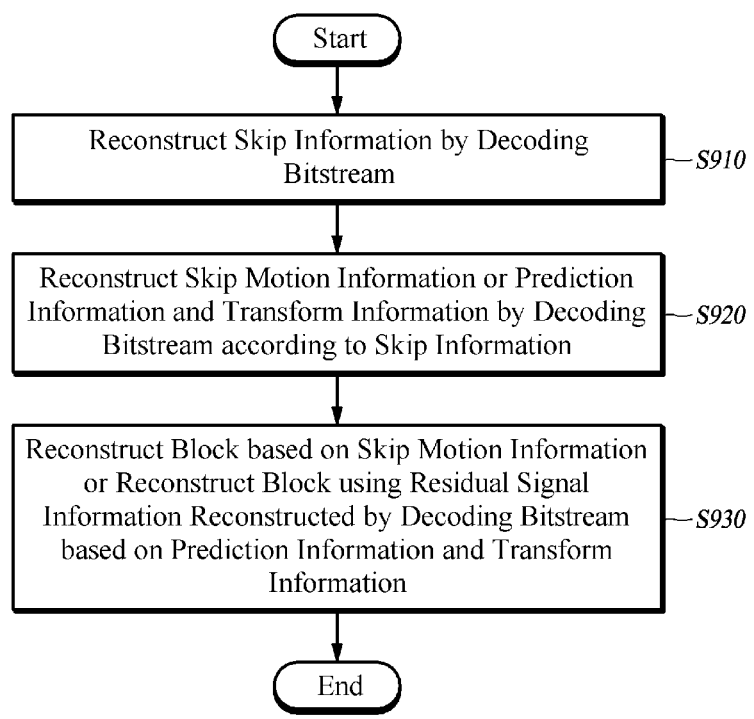
FIG. 9 is a flowchart of a video decoding method according to a first exemplary embodiment of the present disclosure.

FIG. 9 is a flowchart illustrating a video decoding method according to the first exemplary embodiment of the present disclosure.

In the video decoding method according to the first exemplary embodiment of the present disclosure, the video decoding apparatus 800 reconstructs the skip information indicating whether the block to be decoded in the image is the skip block by decoding the bitstream (S910). Specifically, the video decoding apparatus 800 reconstructs the skip information by extracting the skip information-encoded data from the bitstream for the block to be decoded and decoding the extracted data.

The video decoding apparatus 800 reconstructs the skip motion information or the intra or inter prediction information and transform information of the block by decoding the bitstream according to the skip information (S920). The video decoding apparatus 800 reconstructs the block based on the skip information or reconstructs the block by decoding the residual signal information reconstructed by decoding the bitstream based on the prediction information and the transform information (S930). That is, the video decoding apparatus 800 decodes the block in different methods according to the reconstructed skip information indicating whether the block to be decoded is the skip block.

Hereinafter, the process of steps S920 and S930 performed by the video decoding apparatus 800 will be described based on an assumption that the block to be decoded is the macroblock having the 64×64 pixel size.

In step S920, when the reconstructed skip information indicates that the block to be currently decoded is the skip block, the video decoding apparatus 800 may reconstruct the first partition information and the skip motion information of the block by decoding the bitstream. Specifically, the video decoding apparatus 800 reconstructs the skip motion information by extracting the skip motion information in the number corresponding to the number of subblocks within the block from the bitstream and decoding the extracted skip motion information by extracting the first partition information from the bitstream and reconstructing the extracted first partition information. In step S930, the video decoding apparatus 800 reconstructs the predicted block generated by compensating for the motion of each block by using the reconstructed skip motion information as the block to be decoded.

In step S920, when the skip information indicates that the block to be currently decoded is not the skip block, the video decoding apparatus 800 may reconstruct the prediction information of the block by decoding the bitstream. Specifically, the video decoding apparatus 800 reconstructs the prediction information and the transform information by extracting the prediction information-encoded data and the transform information-encoded data from the bitstream and decoding the extracted data. Here, the prediction information is reconstructed as the prediction type information of the block to be decoded, the first partition information indicating the size and the shape of the subblock within the block, and the intra prediction mode information or the motion information. In this event, in step S930, the video decoding apparatus 800 reconstructs the block to be decoded by reconstructing the residual signal information by extracting the residual signal information-encoded data from the bitstream and decoding the extracted data based on the reconstructed prediction information and transform information and reconstructing the residual block by inversely quantizing and inversely transforming the reconstructed residual signal information, generating the predicted block by predicting the block to be decoded based on the prediction information and the transform information, and adding the reconstructed residual block and the predicted block.

Further, when the reconstructed skip information indicates that the block to be decoded is not the skip block, the prediction information may additionally include the skip subblock flag indicating whether each subblock is the skip subblock, as well as the prediction type flag indicating whether the block is the inter macroblock or the intra macroblock and the first partition information indicating the size and the shape of the subblock within the block for the prediction. That is, when the block to be decoded is not the skip block, the video decoding apparatus 800 is not required to extract the residual signal information-encoded data and the prediction information-encoded data from the bitstream and decode the extracted data, and when the video decoding apparatus 800 decodes only the skip subblock flag from the bitstream and determines that a block mode of a predetermined subblock is the skip mode, the video decoding apparatus 800 may skip the decoding for the corresponding subblock.

In step S920, when the video decoding apparatus 800 reconstructs the first partition information or the second partition information by decoding the bitstream, the video decoding apparatus 800 may reconstruct the partition information by using the tree structure. Further, the macroblock partition information may be also reconstructed using the tree structure.

According to the first exemplary embodiment of the present disclosure, the encoding information decoder 810 decodes the information (e.g. the partition information) on the image to be decoded by using the tree structure.

The encoding information decoder 810 reconstructs the side information containing information on a maximum number of layers and information on a size of an area indicated by each lowest node of the lowest layer by decoding the bitstream. The reconstructed side information is used for the reconstruction of the tree structure. In this event, the encoding information decoder 810 reconstructs the side information by extracting the side information-encoded data from the header of the bitstream and decoding the extracted data. Here, the header of the bitstream may be a header of a macroblock, a header of a slice, a header of a picture, a header of a sequence, etc.

Further, when the encoding apparatus 100 and the decoding apparatus 800 pre-arrange the maximum number of layers, the size of the area indicated by each node of the lowest layer, etc. with each other, the encoding apparatus 100 may not encode the side information and thus the decoding apparatus 800 may reconstruct the tree structure by using the predetermined side information, without reconstructing the side information through the decoding of the bitstream.

The encoding information decoder 810 reconstructs the information by reconstructing the flag indicating whether the node for each layer from the highest layer to the lowest layer is partitioned through the decoding of the bitstream based on the side information and reconstructing the node value of the node for each layer according to the reconstructed flag. Specifically, the encoding information decoder 810 reconstructs the flag indicating whether the node for each layer from the highest layer to the lowest layer is partitioned by decoding the bitstream based on the side information reconstructed by the encoding information decoder 810 or the predetermined side information, and when the node is not partitioned, the encoding information decoder 810 reconstructs the tree structure by reconstructing the node value of the node and reconstructs the information to be decoded based on the reconstructed tree structure.

According to the decoding method using the tree structure according to a second exemplary embodiment of the present disclosure, the encoding information decoder 810 reconstructs the side information containing the information on the maximum number of layers and the information on the size of an area indicated by each node of the lowest layer by decoding the bitstream, and reconstructs the information by reconstructing the flag indicating whether the node for each layer from the highest layer to the lowest layer is partitioned through the decoding of a bit string extracted from the bitstream based on the side information and reconstructing the node value of the node for each layer according to the reconstructed flag.

When the flag indicating whether the node for each layer is partitioned indicates that the node is not partitioned into nodes of a lower layer, the encoding information decoder 810 may reconstruct the node value of the node. That is, the encoding information decoder 810 reconstructs the flag indicating whether the node for each layer is partitioned, and performs decoding on a next node when the reconstructed flag indicates that the corresponding node is partitioned into the nodes of the lower layer and reconstructs the node value of the corresponding node only when the reconstructed flag indicates that the corresponding node is not partitioned into the nodes of the lower layer.

The encoding information decoder 810 may reconstruct only a node value of each node for the nodes of the lowest layer. Specifically, in the process of reconstructing the flag indicating whether the node for each layer is partitioned and/or the node value of the node, the encoding information decoder 810 pre-determines whether the node to be decoded is included in the lowest layer, and when the node to be decoded is included in the lowest layer, the encoding information decoder 810 reconstructs only the node value of the corresponding node without reconstructing the flag indicating whether the corresponding node layer is partitioned.

Hereinafter, a process of reconstructing the partition type information by using the tree structure when the partition information is reconstructed by decoding the bitstream according to the first exemplary embodiment of the present disclosure will be described with reference to FIGS. 6A to 7.

In encoding the highest node value by the video encoding apparatus 100, when the partition type number is set to the partition information, the large partition type number is set in the higher order of the generation frequency of the partition type, and the difference value between the partition type number and the largest partition type number is encoded using the binary bit "0" and "1", the video decoding apparatus 800 reconstructs the highest node value by extracting the partition type information-encoded data from the bitstream, reconstructing the difference value by decoding the binary bits "0" and "1" of the extracted data, and subtracting the reconstructed difference value from the largest partition type number. In this event, in order to reconstruct the difference value, the video decoding apparatus 800 fetches and decodes 1 bit of the partition type information-encoded data and reconstructs the binary bit, and fetches a next bit when the reconstructed binary bit is "0". The video decoding apparatus 800 continuously reconstructs the binary bit "0" until the binary bit "1" is reconstructed by performing the decoding according to the aforementioned method, and when the reconstructed binary bit is "1", the video decoding apparatus 800 does not fetch and decode the bit any longer, and the difference value becomes the number of reconstructed binary bit "0". However, when the bit in the number corresponding to the difference value between the maximum value and the minimum value among the available partition type numbers has been fetched, the video decoding apparatus 800 does not fetch a next bit and the difference value becomes the number of reconstructed binary bit "0" (in this event, the difference value is the value of the difference between the maximum value and the minimum value among the available partition type numbers).

On the contrary, in encoding the highest node value by the video encoding apparatus 100, when the partition type number is set to the partition information, the large partition type number is set in the lower order of the generation frequency of the partition type, and the difference value between the partition type number and the smallest partition type number is encoded using the binary bit "0" and "1", the video decoding apparatus 800 reconstructs the highest node value by extracting the partition type information-encoded data from the bitstream, reconstructing the difference value by decoding the binary bits "0" and "1" of the extracted data, and subtracting the reconstructed difference value from the smallest partition type number. In this event, the method of reconstructing the difference value by the video decoding apparatus 800 is the same as the aforementioned method.

Further, in encoding the highest node value by the video encoding apparatus 100, when the video encoding apparatus 100 encodes the highest node value by encoding the difference value between the partition type number and 0 by using the binary bits "0" and "1" as described above, the video decoding apparatus extracts the partition type information-encoded data from the bitstream and decodes the binary bits "0" and "1" of the extracted data, to reconstruct the reconstructed difference value as the highest node value. In this event, the method of reconstructing the difference value by the video decoding apparatus 800 is the same as the aforementioned method.

Then, the video decoding apparatus 800 decodes the node values of the lower nodes of the highest node. When the video encoding apparatus 100 encodes the node value by encoding the binary bit "0" in the number corresponding the difference value between the node value of the node to be encoded and the node value of the higher layer, the video decoding apparatus 800 fetches and decodes one proceeding bit of the bits extracted from the bitstream and fetched for the reconstruction of the highest node value and fetches and decodes a proceeding bit when the reconstructed binary bit is "0", in the decoding of the node values of the respective nodes. When the reconstructed node value of the higher layer is the maximum value among the available partition type numbers, the video decoding apparatus 800 does not reconstruct the binary bit, but reconstructs the maximum value among the available partition type numbers as the node value of the node to be decoded. When the reconstructed binary bit is "1", the video decoding apparatus 800 does not fetch the bit any longer, and reconstructs the number of reconstructed binary bit "0" as the difference value and adds the node value of the higher layer to the reconstructed difference value, to reconstruct the node value of the node to be decoded. When the video encoding apparatus encodes the node value by encoding the binary bit "1" in the number corresponding to the difference value between the node value of the node to be encoded and the node value of the higher layer, the video decoding apparatus 800 reconstructs the binary bit by decoding every 1 bit until the binary bit reconstructed according to the aforementioned method becomes "0".

However, in the reconstruction of the node value of the node to be decoded, when the value obtained by adding the difference value according to the number of binary bit "0" reconstructed so far and the node value of the higher layer of the corresponding node is the maximum value among the available partition type numbers, the video decoding apparatus 800 reconstructs the maximum value among the available partition type numbers as the corresponding node value, without fetching the bit and reconstructing the binary bit any longer. Further, when all the node values of the nodes other than the last node are larger than the node value of the higher layer in the reconstruction of the node value of the last node among the nodes having the same higher node, the video decoding apparatus 800 does not fetch the bit and reconstruct the binary bit any longer, but reconstructs the node value of the higher layer as the node value of the last node.

In another exemplary embodiment in which the partition type information is decoded using the tree structure, in the case where the large partition type number is set in the higher order of the generation frequency of the partition type when the partition information of said predetermined area of FIG. 6B is set by grouping the partition information of the sub-blocks illustrated in FIG. 6A, the video decoding apparatus 800 reconstructs the node value of the current node by subtracting the reconstructed node value of the higher node from the node value of the current node.

As described above, according to the first exemplary embodiment of the present disclosure, the corresponding block may be efficiently encoded and decoded according to the combination of the block mode and the partition mode of the block to be encoded in the image, so that the video compression efficiency may be improved.

Until now, the method of encoding the corresponding block according to the combination of the skip information and the partition information of the block to be encoded and the syntax structure of the bitstream generated through the encoding according to some exemplary embodiment of the present disclosure have been described. Hereinafter, a method of encoding an image by selectively using encoding methods for a corresponding block according to skip type information of a block to be encoded according to another exemplary embodiment of the present disclosure will be described.

Figure 10:
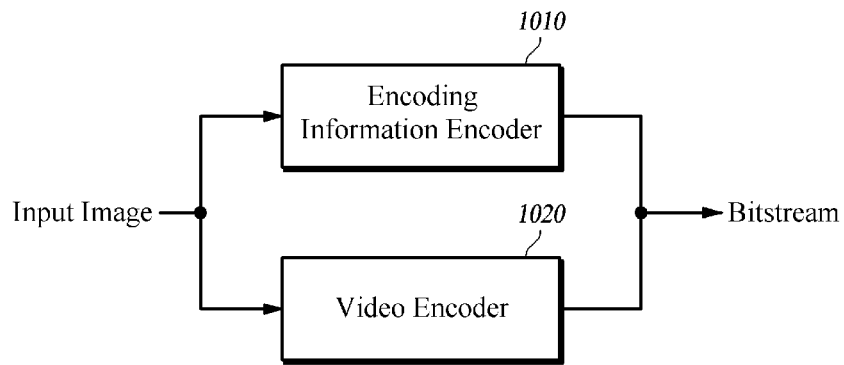
FIG. 10 is a block diagram of a video encoding apparatus according to a second exemplary embodiment of the present disclosure.

FIG. 10 is a block diagram schematically illustrating a video encoding apparatus according to a second exemplary embodiment of the present disclosure.

The video encoding apparatus according to the second exemplary embodiment of the present disclosure may include an encoding information encoder 1010 and a video encoder 1020.

The encoding information encoder 1010 encodes the skip type information indicating a skip type of the block to be encoded in the image and encodes the skip motion information of the block according to the skip type information. Specifically, when the block mode of the block to be encoded is the skip mode, the encoding information encoder 1010 encodes the skip type information indicating the skip type of the block and encodes the skip motion information of the block based on the skip type information. For example, when the skip type of the block indicates the encoding of the skip motion information of the block, the encoding information encoder 1010 encodes the skip motion information of the block.

The video encoder 1020 encodes the residual signal information of the block according to the skip type information of the block. Specifically, when the block mode of the block to be encoded is the skip mode, the video encoder 1020 encodes the residual signal information of the block based on the skip type information. For example, when the skip type of the block indicates the encoding of the residual signal information of the block, the video encoder 1020 encodes the skip motion information. The video encoder 1020 may include a predictor, a subtracter, a transformer and quantizer, an encoder, an inverse quantizer and inverse transformer, an adder, a filter, and a picture buffer, likewise to the video encoder 120 according to the first exemplary embodiment of the present disclosure aforementioned with reference to FIG. 1.

When the skip type information of the block indicates the skipping of the encoding for the block, neither the skip motion information nor the residual signal information of the corresponding block are encoded, but only the skip type information is encoded.

Figure 11:
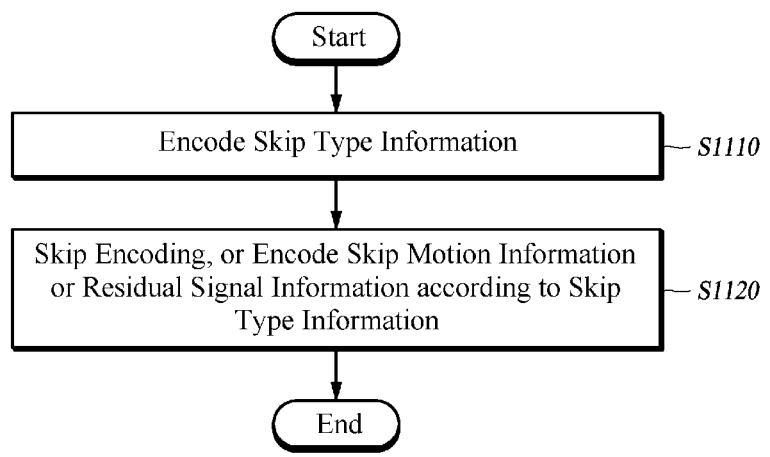
FIG. 11 is a flowchart of a video encoding method according to a second exemplary embodiment of the present disclosure.

FIG. 11 is a flowchart illustrating a video encoding method according to the second exemplary embodiment of the present disclosure.

According to the video encoding method according to the second exemplary embodiment of the present disclosure, the video encoding apparatus 100 encodes the skip type information indicating the skip type of the block to be encoded in the image (S1110). Here, the skip type indicates a method of encoding the block in the skip mode when the block mode of the block is the skip mode. Specifically, when the block mode of the block to be encoded is the skip mode, the video encoding apparatus 1000 encodes the skip type information indicating whether to encode only the residual signal information of the block, whether to encode only the motion information of the block, or whether to skip the encoding for the block when the corresponding block is encoded according to the skip mode.

The skip type information may be implemented with the skip type flag of 1 bit, through which three skip types may be represented. For example, when the skip type flag is "0", it indicates the skip mode in which the encoding for the block is skipped, and when the skip type flag is "1", it indicates the skip mode in which the residual signal information of the block is not encoded and the skip motion vector of the block is encoded. For another example, when the skip type flag is "0", it indicates the skip mode in which the encoding for the block is skipped, and when the skip type flag is "1", it indicates the skip mode in which the skip motion vector of the block is not encoded but the residual signal information of the block is encoded. For still another example, when the skip type flag is "0", it indicates the skip mode in which the residual signal information of the block is not encoded but the skip motion vector of the block is encoded, and when the skip type flag is "1", it indicates the skip mode in which the skip motion vector of the block is not encoded but the residual signal information of the block is encoded.

The video encoding apparatus 100 skips the encoding of the block, encodes the skip motion information of the block, or encodes the residual signal information of the block according to the skip type information (S1120).

Here, the skip type information may indicate the skipping of the encoding of the block or the encoding of the skip motion information of the block. Otherwise, the skip type information may indicate the skipping of the encoding of the block or the encoding of the residual signal information of the block. Otherwise, the skip type information may indicate the encoding of the skip motion information of the block or the encoding of the residual signal information of the block.

Accordingly, in step S1120, when the skip type information indicates the skip type of the block in which the encoding of the block is skipped, the video encoding apparatus 1000 skips the encoding of the block.

Further, in step S1120, when the skip type information indicates the skip type of the block in which the skip motion information is encoded, the video encoding apparatus 1000 encodes the skip motion information of the block to be encoded and does not encode the residual signal information of the corresponding block.

Further, in step S1120, when the skip type information indicates the skip type of the block in which the residual signal information is encoded, the video encoding apparatus 1000 encodes the residual signal information of the block to be encoded and does not encode the skip motion vector information of the corresponding block. In this event, the residual signal information of the block to be encoded may be predictive-encoded using motion information determined based on the motion information of a neighboring block of the corresponding block.

Figure 12:
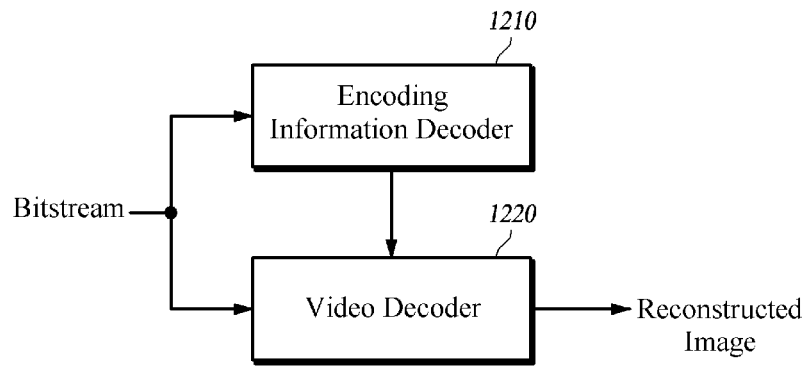
FIG. 12 is a block diagram of a construction of a video decoding apparatus according to a second exemplary embodiment of the present disclosure.

FIG. 12 is a block diagram schematically illustrating a construction of a video decoding apparatus 1200 according to the second exemplary embodiment of the present disclosure.

The video decoding apparatus 1200 according to the second exemplary embodiment of the present disclosure may include an encoding information decoder 1210 and a video decoder 1220.

The encoding information decoder 1210 reconstructs the skip type information indicating the skip type of the block to be decoded in the image by decoding the bitstream, and reconstructs the skip motion information of the block to be decoded by decoding the bitstream according to the skip type information.

The video decoder 1220 reconstructs the block based on the motion information determined according to a predetermined method, reconstructs the block based on the skip motion information, or reconstructs the block based on the residual signal information reconstructed by decoding the bitstream in accordance with the skip type information.

Specifically, when the skip type information reconstructed by the encoding information decoder 1210 indicates the skip type of the block in which the skip motion vector is encoded, the video decoder 1220 reconstructs the block generated by compensating for the motion of the block to be decoded as the block to be decoded by using the skip motion information reconstructed by the encoding information decoder 1210. Further, when the skip type information reconstructed by the encoding information decoder 1210 indicates the skip type of the block in which the residual signal information is encoded, the video decoder 1220 reconstructs the block to be decoded by reconstructing the residual signal information by decoding the bitstream, reconstructing the residual block by inversely quantizing and inversely transforming the reconstructed residual signal information, and adding the residual block and the predicted block generated by compensating for the motion of the block by using the motion information determined in the predetermined method. When the skip type information reconstructed by the encoding information decoder 1210 indicates the skip type of the block in which the encoding of the block is skipped, the video decoder 1220 reconstructs the block generated by compensating for the motion of the corresponding block by using the motion information determined in the predetermined method as the corresponding block.

Here, the motion information determined in the predetermined method may be the motion information determined using the motion information of the neighboring block, but it is not essentially limited thereto and the motion information determined in various predetermined methods may be used.

Figure 13:
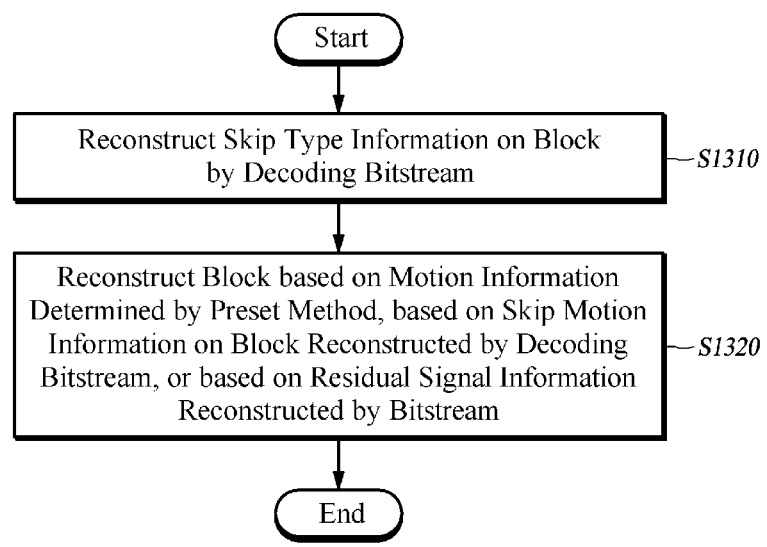
FIG. 13 is a diagram for illustrating an example of a tree structure according to a second exemplary embodiment of the present disclosure.

FIG. 13 is a flowchart illustrating a video decoding method according to the second exemplary embodiment of the present disclosure.

According to the video decoding method according to the second exemplary embodiment of the present disclosure, the video decoding apparatus 1200 reconstructs the skip type information indicating the skip type of the block to be decoded by decoding the bitstream (S1310), and reconstructs the block based on the motion information determined in the predetermined method, based on the skip motion information of the block reconstructed by decoding the bitstream, or based on the residual signal information reconstructed by decoding the bitstream according to the skip type information (S1320).

In step S1310, the video decoding apparatus 1200 may reconstruct the skip type information only when the block mode of the block is the skip mode. Specifically, since the skip type information-encode data is included in the bitstream only when the block mode of the block to be decoded is the skip mode, the video decoding apparatus 1200 reconstructs the skip type information by extracting the skip type information-encoded data from the bitstream and decoding the extracted data only when the block mode of the block to be decoded is the skip mode.

In step S1320, when the reconstructed skip type information indicates the skipping of the encoding of the block, the video decoding apparatus 1200 may reconstruct the block based on the motion information determined in the predetermined method. Specifically, when the skip type information indicates the skipping of the encoding of the block, the video decoding apparatus 1200 may be aware that the bitstream does not include the encoding information-encoded data or the residual signal information-encoded data for the corresponding block because the video encoding apparatus 1000 skips the encoding of the corresponding block. Accordingly, the video decoding apparatus 1200 does not extract the data from the bitstream and decode the extracted data, but determines the motion information (i.e. the motion vector and the reference picture index) on the corresponding block in the predetermined method pre-arranged with the video encoding apparatus 1000 and reconstructs the block generated by compensating for the motion of the corresponding block by using the determined motion information as the block to be decoded.

In step S1320, when the skip type information indicates the encoding of the skip motion information of the block, the video decoding apparatus 1200 may reconstruct the block based on the skip motion information of the block reconstructed by decoding the bitstream. Specifically, when the skip type information indicates the encoding of the skip motion information of the block, the video decoding apparatus 1200 may be aware that the bitstream does not include the residual signal information-encoded data for the corresponding block because the video encoding apparatus 1000 encodes the skip motion information, not the residual signal information, on the corresponding block. Accordingly, the video decoding apparatus 1200 reconstructs the skip motion information by extracting the skip motion information-encoded data from the bitstream and decoding the extracted data and reconstructs the block generated by compensating for the motion of the corresponding block by using the reconstructed skip motion information as the block to be decoded.

In step S1320, when the skip type information indicates the encoding of the residual signal information of the block, the video decoding apparatus 1200 may reconstruct the block based on the residual signal information of the block reconstructed by decoding the bitstream. Specifically, when the skip type information indicates the encoding of the residual signal information of the block, the video decoding apparatus 1200 may be aware that the bitstream does not include the skip information-encoded data for the corresponding block because the video encoding apparatus 1000 encodes the residual signal information, not the skip motion information, on the corresponding block. Accordingly, the video decoding apparatus 1200 reconstructs the block to be encoded by reconstructing the residual signal information by extracting the residual signal information-encoded data from the bitstream and decoding the extracted data, reconstructing the residual block by inversely quantizing and inversely transforming the reconstructed residual signal information, determining the motion information (i.e. the motion vector and the reference picture index) on the corresponding block in the predetermined method pre-arranged with the video encoding apparatus 1000, and adding the predicted block generated by compensating for the motion of the corresponding block by using the determined motion information and the reconstructed residual block.

As described above, according to the second exemplary embodiment of the present disclosure, the image may be encoded and decoded by defining a skip mode of a block in various methods and selectively using the various skip modes depending on a characteristic and/or an implementation scheme of an image or the necessity, so that the video compression efficiency may be improved.

Hereinafter, an encoding method using another tree structure will be described with reference to FIGS. 14 to 16.

Figure 14:
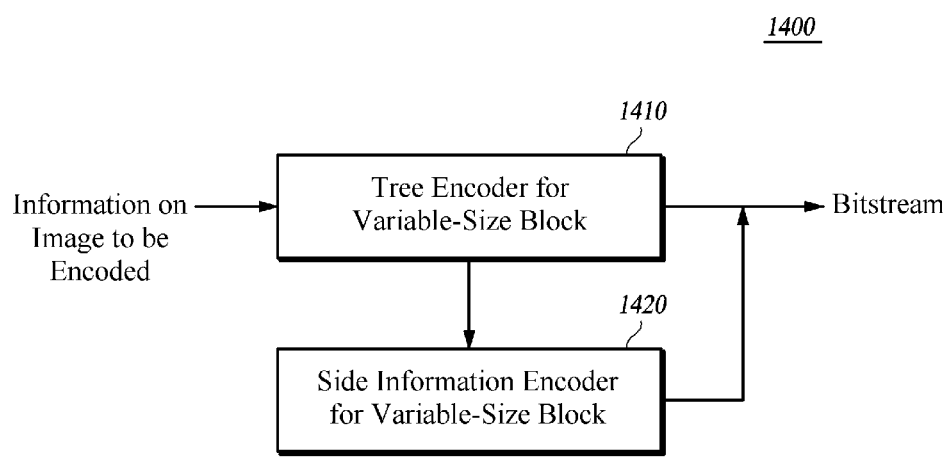
FIG. 14 is a block diagram of an encoding apparatus using a tree structure according to a third exemplary embodiment of the present disclosure.

FIG. 14 is a block diagram schematically illustrating an encoding apparatus using the tree structure according to a third exemplary embodiment of the present disclosure.

The video encoding apparatus 1400 using the tree structure according to the third exemplary embodiment of the present disclosure may include a tree encoder 1410 for a variable-size block and a side information encoder 1420 for the variable-size block.

The tree encoder 1410 for the variable sized-block groups predetermined areas having the same information among areas having information on an image to be encoded and encodes one or more of a flag indicating whether a node is partitioned and a node value according to whether the node is partitioned, for each node in each layer.

The side information encoder 1420 for the variable-size block encodes side information containing information on the maximum number of layers of the tree structure according to the third exemplary embodiment and information on a size of an area indicated by each node of the lowest layer. The encoded side information may be included in a header of the bitstream, such as a header of a sequence, a header of a picture, a header of a slice, and a header of a macroblock.

Hereinafter, a process of encoding the information to be encoded by using the tree structure will be described with reference to FIGS. 15A to 16 in detail.

Figures 15A, 15B, 15C:
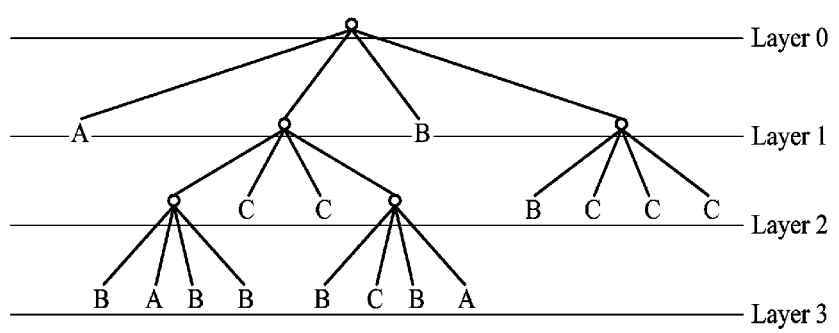
FIG. 15A is an example of areas including the information to be encoded within a single picture.
FIG. 15B is an example of the grouped areas having the same information among the areas having the information illustrated in FIG. 15A.
FIG. 15C is an example of the tree structure of the information on the grouped areas including the same information.

FIGS. 15A to 15C illustrate examples of the tree structure according to the third exemplary embodiment used in the encoding method using the tree structure of the present disclosure.

FIG. 15A illustrates areas including the information to be encoded within a single picture. The respective areas may be macroblocks having a 16×16 pixel size, and A, B, and C indicated in the respective areas indicate the information on the area to be encoded. The information may be the partition information, but it is not essentially limited thereto, and may include various information, such as intra prediction mode, motion vector precision, and residual signal information (coefficient information). However, in some exemplary embodiments of the present disclosure, it is assumed that the respective areas are macroblocks having the 16×16 pixel size, but may have various forms, such as a block having a 64×64 pixel size, a block having a 32×32 pixel size, a block having a 16×32 pixel size, a block having a 16×16 pixel size, a block having a 16×8 pixel size, a block having an 8×8 pixel size, a block having an 8×4 pixel size, a block having a 4×8 pixel size, and a block having a 4×4 pixel size, as well as the block having the 16×16 pixel size. Further, the sizes of the respective areas may be different from each other.

FIG. 15B illustrates the grouped areas having the same information among the areas having the information illustrated in FIG. 15A. FIG. 15C illustrates the tree structure of the information on the grouped areas including the same information. In FIG. 15C, a size of an area indicated by the lowest node is a macroblock having the 16×16 pixel size and the maximum number of layers in the tree structure is four, so that the side information is encoded and inserted in the header for the corresponding area.

Figure 16:
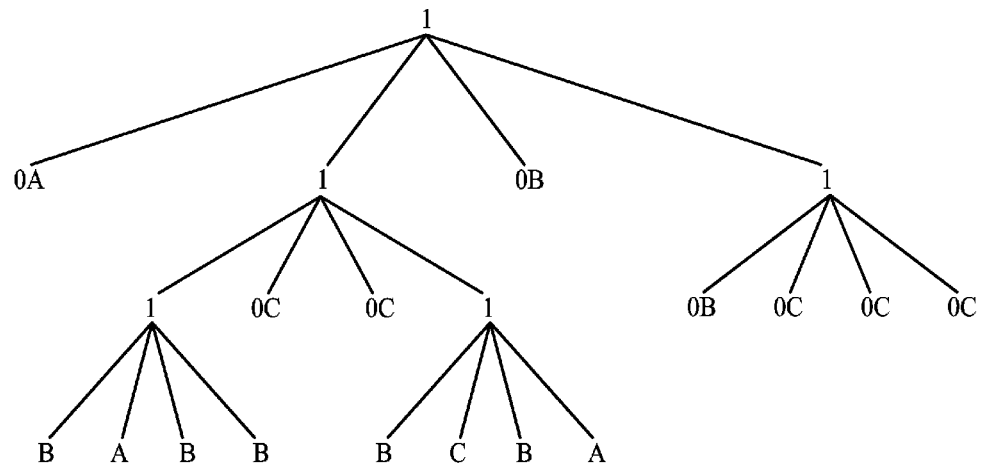
FIG. 16 is an example of an encoding result of information expressed in a tree structure according to a third exemplary embodiment of the present disclosure.

FIG. 16 illustrates an example of an encoding result of information expressed in the tree structure according to the third exemplary embodiment of the present disclosure.

When the information in the tree structure illustrated in FIG. 16 is encoded, a final bit string illustrated in FIG. 16 may be obtained. Whether a node is partitioned into nodes in a lower layer is encoded as 1 bit. For example, when a bit value is "1", it indicates that a current node is partitioned into nodes in a lower layer, and when a bit value is "0", it indicates that a current node is not partitioned into nodes in a lower layer. In the case of the nodes of the lowest layer, whether the node is partitioned into nodes of a lower layer is not encoded, but node values of the nodes of the lowest layer are encoded.

In FIG. 15C, when a node of layer 0 is partitioned into nodes of a lower layer of layer 0, the bit value 1 is encoded. A node value of the first partitioned node of layer 1 is "A" and the first partitioned node of layer 1 is not partitioned into nodes of a lower layer of layer 1 any longer, so that the bit value "0" is encoded and node value "A" is encoded. The second node of layer 1 is partitioned into nodes of the lower layer of layer 1, so that the bit value "1" is encoded. A node value of the third node of layer 1 is not partitioned into nodes of the lower layer of layer 1, so that the bit value "0" is encoded and node value "B" is encoded. The fourth node of layer 1 is partitioned into nodes of the lower layer of layer 1, so that the bit value "1" is encoded. In the same method, respective nodes of layer 2 are encoded, and since it can be aware that there is no node of a lower layer of layer 3 because the maximum number of layers is designated as four in the header, only each node value of layer 3 is encoded.

The respective node values are indicated as A, B, and C for convenience of the description, but they may be expressed with binary bits. Further, the example of only two cases of the partition of a node into nodes of a lower layer and the non-partition of a node into nodes of a lower layer is illustrated in FIGS. 15A to 15C. In the present embodiment, when the node is partitioned into the nodes of the lower layer, the node is partitioned into four nodes. Referring to FIGS. 15A to 15C, the partition of the node into the four nodes of the lower layer means that the area corresponding to the node of the current layer is partitioned into the same four subareas.

Figure 17:
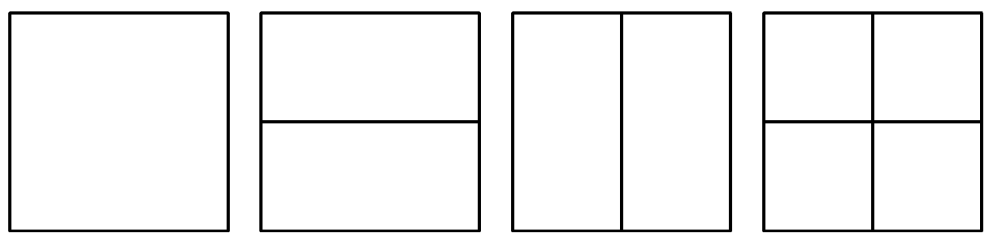
FIG. 17 is an example of a different scheme for partitioning a node into nodes of a lower layer according to a third exemplary embodiment of the present disclosure.

Alternatively, as illustrated in FIG. 17, the node may be partitioned into various shapes of nodes of a lower layer, such as non-partition of a node into nodes of a lower layer, partition of a node into two horizontally long nodes of a lower layer, partition of a node into two vertically long nodes of a lower layer, and partition of a node into four nodes of a lower layer. In this event, information indicating the four partition types may be transmitted to the video decoding apparatus.

When a size of an area including the grouped areas is not large, the video encoding apparatus 1400 may decrease a quantity of bits for indication of the existence of nodes in a lower layer by encoding a flag indicating that the partition of a node of a higher node is partitioned into nodes of a specific layer. For example, when a maximum number of layers is designated as four in the header of the bitstream and the information to be encoded is distributed as illustrated in FIG. 18, the areas illustrated in FIG. 18 may be displayed as FIG. 19 by grouping the areas having the same information. In this event, the video encoding apparatus 1400 may decrease a quantity of bits by reducing the number of flags indicating the partition of a node of a higher layer into nodes of a lower layer through the encoding of the flag indicating that the node of the highest layer is partitioned into the nodes of layer 2 or layer 3.

Figure 20:
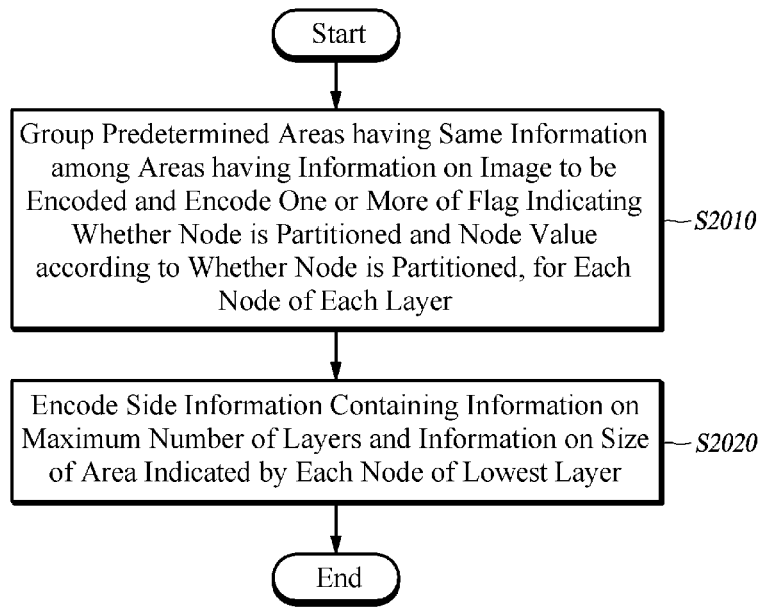
FIG. 20 is a flowchart of an encoding method using a tree structure according to a third exemplary embodiment of the present disclosure.

FIG. 20 is a flowchart illustrating an encoding method using the tree structure according to the third exemplary embodiment of the present disclosure.

In the encoding method using the tree structure according to the third exemplary embodiment of the present disclosure, the video encoding apparatus 1400 groups predetermined areas having the same information among areas having information on an image to be encoded and encodes one or more of a flag indicating whether a node is partitioned and a node value according to whether the node is partitioned, for each node of each layer (S2010), and encodes side information containing information on the maximum number of layers and information on a size of an area indicated by each node of the lowest layer (S2020).

In step S2010, when the node is partitioned, the video encoding apparatus 1400 may encode the flag indicating the partition of the node. Specifically, the video encoding apparatus 1400 determines whether the node is partitioned for each node of each layer, and when the node is partitioned, the video encoding apparatus 1400 may encode only the flag indicating the partition of the corresponding node into nodes of the lower layer without encoding a corresponding node value.

In step S2010, when the node is not partitioned, the video encoding apparatus 1400 may encode the flag indicating the non-partition of the node and the node value of the node. Specifically, the video encoding apparatus 1400 determines whether the node is partitioned for each node of each layer, and when the node is not partitioned, the video encoding apparatus 1400 may encode the value of the corresponding node, as well as the flag indicating the non-partition of the corresponding node into the nodes of the lower layer. Here, the node value of the node means information on the node, and when a single node is configured by grouping the areas having the same information, the same information is the node value.

In step S2010, when the node is the node of the lowest layer, the video encoding apparatus 1400 may encode only a node value of the node. Specifically, the video encoding apparatus 1400 determines whether a node to be encoded is the lowest layer before determination on whether the node is partitioned for each mode of each layer, and when the node is the node of the lowest layer, the video encoding apparatus 1400 may encode only the node value of the corresponding node without encoding the flag indicating whether the corresponding node is partitioned.

In step S2020, the video encoding apparatus 1400 may insert the side information-encoded data in the header of the bitstream. Here, the header of the bitstream may be headers of various encoding units, such as a header of a sequence, a header of a picture, a header of a slice, and a header of a macroblock.

In step S2010, in encoding the flag indicating the partition of the node, the video encoding apparatus 1400 may encode the flag indicating the direct partition of the node into nodes of one or more lower layers. Specifically, in encoding the flag indicating the partition of the node, when the corresponding node is partitioned into the nodes of the lower layer, the video encoding apparatus 1400 may encode the flag indicating the partition of the corresponding node into the nodes of multiple lower layers, as well as the flag indicating the partition of the corresponding node into the nodes of the one directly lower layer.

Figure 21:
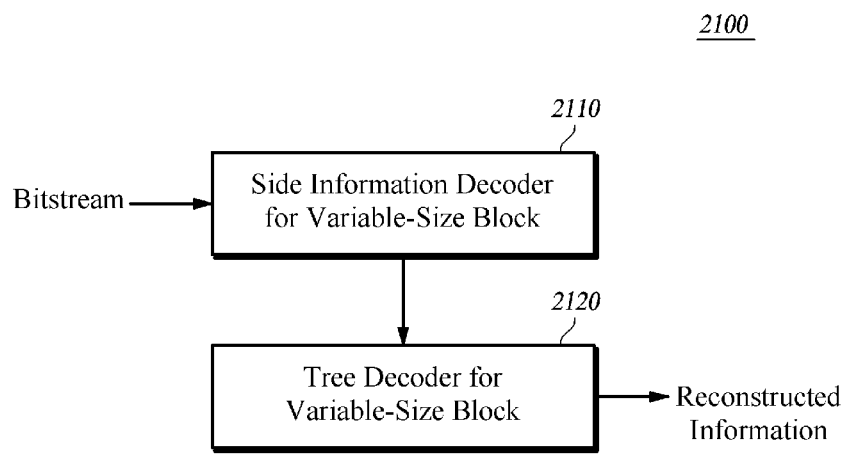
FIG. 21 is a block diagram of a decoding apparatus using a tree structure according to a third exemplary embodiment of the present disclosure.

FIG. 21 is a block diagram schematically illustrating a video decoding apparatus using the tree structure according to the third exemplary embodiment of the present disclosure.

The video decoding apparatus 2100 using the tree structure according to the third exemplary embodiment of the present disclosure includes a side information decoder 2110 for a variable-size block and a tree decoder 2120 for a variable-size block.

The side information decoder 2110 for the variable-size block reconstructs the side information containing the information on the maximum number of layers and the information on the size of an area indicated by each node of the lowest layer by decoding the bitstream. The reconstructed side information is used for the reconstruction of the tree structure by the side information decoder 2110 for the variable-size block. In this event, the side information decoder 2110 for the variable-size block reconstructs the side information by extracting the side-information encoded data from the header of the bitstream and decoding the extracted data, and the header of the bitstream may include a header of a macroblock, a header of a slice, a header of a picture, a header of a sequence, etc.

However, the side information decoder 2110 for the variable-size block is not necessarily included in the video decoding apparatus 2100, and may be selectively included therein depending on the implementation method and the necessity. For example, when the video encoding apparatus 1400 and the video decoding apparatus 2100 pre-arrange the maximum number of layers, the size of the area indicated by each node of the lowest layer, etc. with each other, the video encoding apparatus 1400 may not encode the side information and thus the video decoding apparatus 2100 may reconstruct the tree structure by using the predetermined side information, without reconstructing the side information through the decoding of the bitstream.

The tree decoder 2120 for the variable-size block reconstructs the information by reconstructing the flag indicating whether the node for each layer from the highest layer to the lowest layer is partitioned through the decoding of the bitstream based on the side information and reconstructing the node value of the node for each layer according to the reconstructed flag. Specifically, the tree decoder 2120 for the variable-size block reconstructs the flag indicating whether the node for each layer from the highest layer to the lowest layer is partitioned by decoding the bitstream based on the side information reconstructed by the side information decoder 2110 for the variable-size block or the predetermined side information, and when the node is not partitioned, the tree decoder 2120 for the variable-size block reconstructs the tree structure by reconstructing the node value of the node and reconstructs the information to be decoded based on the reconstructed tree structure.

Hereinafter, a process of reconstructing the information by decoding the bitstream by using the tree structure by the video decoding apparatus 2100 will be described with reference to FIGS. 20 and 21.

The video decoding apparatus 2100 reconstructs the side information by extracting the encoded side information from the header of the bitstream, such as a header of a macroblock, a header of a slice, a header of a picture, or a header of a sequence, and decoding the extracted side information. The side information contains the information on the maximum number of layers and the information on the size of an area indicated by each node of the lowest layer in the tree structure.

The video decoding apparatus 2100 extracts a bit string, such as a final bit illustrated in FIG. 16, from the bitstream and reconstructs the tree structure illustrated in FIG. 15C based on the reconstructed side information and the extracted bit string as described above.

For example, the video decoding apparatus 2100 reconstructs the flag indicating whether the node for each layer from the highest layer to the lowest layer is partitioned to the nodes of the lower layer by sequentially fetching a bit value from the bit string of the final bit extracted from the bitstream. When the reconstructed flag indicates that the node is not partitioned into the nodes of the lower layer, the video decoding apparatus 2100 reconstructs the node value of the corresponding node by fetching a proceeding bit string. The reconstructed node value becomes the information to be reconstructed. Further, when the reconstructed flag indicates that the node is partitioned into the nodes of the lower layer, the video decoding apparatus 2100 reconstructs the flag indicating whether a next node or a next node of a next layer is partitioned into nodes of a lower layer of the next layer by fetching a next bit value. The video decoding apparatus 2100 reconstructs the information up to the lowest layer by sequentially fetching the bit string in the aforementioned method. In the meantime, the video decoding apparatus 2100 reconstructs only the node value of each node of the lowest layer without reconstructing the flag indicating whether the node is partitioned.

When the node is partitioned into the nodes of the lower layer, the node is partitioned into the four nodes as described in the example illustrated in FIG. 15. Referring to FIGS. 15A to 15C, the partition of the node into the four nodes of the lower layer means that the area corresponding to the node of the current layer is partitioned into the same four subareas. Alternatively, as illustrated in FIG. 17, the node may be partitioned into various shapes of the nodes of the lower layer, such as non-partition of a node into nodes of a lower layer, partition of a node into two horizontally long nodes of a lower layer, partition of a node into two vertically long nodes of a lower layer, and partition of a node into four nodes of a lower layer. In this event, information indicating the four partition types may be transmitted to the video decoding apparatus from the video encoding apparatus.

The video decoding apparatus 2100 reconstructs the tree structure illustrated in FIG. 15 by reconstructing the information from the highest layer to the lowest layer through the aforementioned method, and reconstructs the information on the respective areas illustrated in FIGS. 15A and 15B based on the reconstructed tree structure.

When the flag reconstructed by decoding the bit string extracted from the bitstream indicates the direct partition of a predetermined node into nodes of multiple lower layers, the video decoding apparatus 2100 skips the decoding of the layers between the indicated lower layers and decodes one or more of the flag indicating whether the nodes of the indicated lower layers are partitioned and a node value of a corresponding node.

Figure 22:
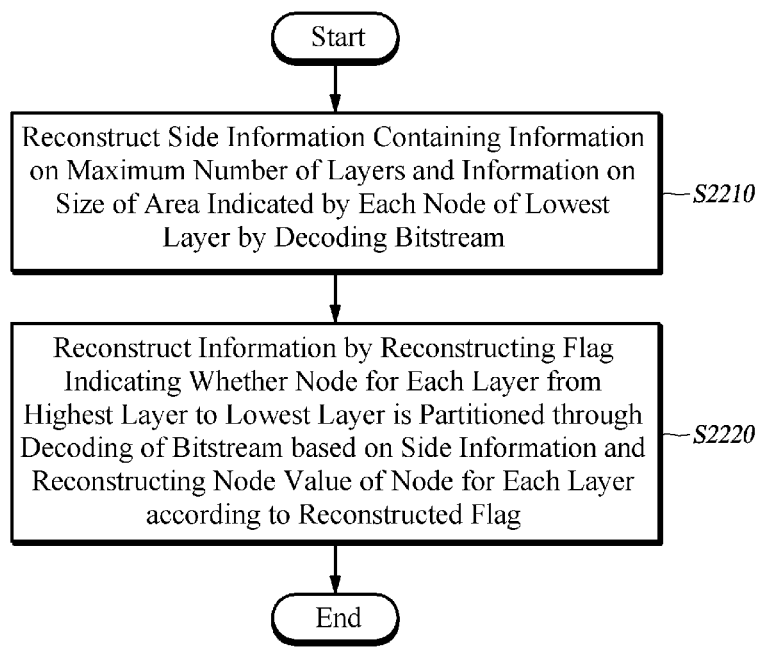
FIG. 22 is a flowchart of a decoding method using a tree structure according to a third exemplary embodiment of the present disclosure.

FIG. 22 is a flowchart illustrating a decoding method using the tree structure according to the third exemplary embodiment of the present disclosure.

According to the decoding method using the tree structure according to the third exemplary embodiment of the present disclosure, the video decoding apparatus 2100 reconstructs the side information containing the information on the maximum number of layers and the information on the size of an area indicated by each node of the lowest layer by decoding the bitstream (S2210), and reconstructs the information by reconstructing the flag indicating whether the node for each layer from the highest layer to the lowest layer is partitioned through the decoding of the bit string extracted from the bitstream based on the side information and reconstructing the node value of the node for each layer according to the reconstructed flag (S2220).

In step S2220, when the flag indicating whether the node is partitioned indicates that the node is not partitioned into the nodes of the lower layer, the video decoding apparatus 2100 may reconstruct the node value of the node. Specifically, the video decoding apparatus 2100 reconstructs the flag indicating whether the node for each layer is partitioned, and when the reconstructed flag indicates that the corresponding node is partitioned into the nodes of the lower layer, the video decoding apparatus 2100 performs the decoding on a next node, and only when the reconstructed flag indicates that the corresponding node is not partitioned into the nodes of the lower layer, the video decoding apparatus 2100 reconstructs the node value of the corresponding node.

When the node is partitioned into the nodes of the lower layer, the node is partitioned into the four nodes as described in the example illustrated in FIG. 15. Alternatively, as illustrated in FIG. 17, the node may be partitioned into various shapes of the nodes of the lower layer, such as non-partition of a node into nodes of a lower layer, partition of a node into two horizontally long nodes of a lower layer, partition of a node into two vertically long nodes of a lower layer, and partition of a node into four nodes of a lower layer. In this event, information indicating the four partition types may be transmitted to the video decoding apparatus from the video encoding apparatus.

In step S2220, the video decoding apparatus 2100 may reconstruct only the node values of the respective nodes of the lowest layer. Specifically, in the process of reconstructing the flag indicating whether the node for each layer is partitioned and/or the node value of the node, the video decoding apparatus 2100 pre-determines whether the node to be decoded is included in the lowest layer, and when the node to be decoded is included in the lowest layer, the video decoding apparatus 2100 reconstructs only the node value of the corresponding node without reconstructing the flag indicating whether the corresponding node layer is partitioned.

In the encoding method and the decoding method using the tree structure of the present disclosure, the information to be encoded and decoded is not limited to the data of the present embodiment, and information as follows may be encoded and decoded.

The information to be encoded may include various information used for the encoding of image signal information or an image signal of an image, such as macroblock size information, skip information, macroblock information, partition information indicating a size or a type of a block for prediction or transform, intra prediction information, motion vector information, prediction direction information of a motion vector, an optimum motion vector prediction candidate information, information on an optimum interpolation filter for an area having a predetermined size, information on use or non-use of an image quality improvement filter, a reference picture index, a quantization matrix index, optimum motion vector precision information, transform size information, pixel information of an image, coded block information indicating whether a transform coefficient other than "0" is included within a predetermined block, or residual signal information.

The macroblock in the exemplary embodiment of the present disclosure is a basic unit for the video encoding and decoding and has a variable size. The macroblock size information may be encoded using the tree structure according to the exemplary embodiment of the present disclosure. To this end, the video encoding apparatus generates information on a maximum size and a minimum size of the macroblock, information on the maximum number of layers included in the tree, and a macroblock partition flag and transmits them to the video decoding apparatus. The information on a maximum size and a minimum size of the macroblock and the information on the maximum number of layers included in the tree may be included in the bitstream as header information of a sequence, GOP, picture, or slice. The macroblock partition flag may be included in an encoding unit header while being encoded using the tree structure as illustrated in FIGS. 15 and 16. That is, the information encoded and decoded using the tree structure is the aforementioned macroblock partition flag.

The macroblock having a predetermined size may be used by separately setting a horizontal size and a vertical size for a maximum size and a minimum size of the macroblock. Further, hard sizes may be designated as a maximum size value and a minimum size value of the macroblock to be encoded or a multiple by which a macroblock to be encoded is to be expanded or downsized from a predetermined size may be transmitted. If a multiple by which a maximum size of a macroblock is to be expanded from a predetermined size is encoded and the predetermined size is 16, a value of $\log_2$ (selected MBsize/16) is encoded. For example, when a size of the macroblock is 16×16, "0" is encoded, and when a size of the macroblock is 32×32, "1" is encoded. Further, a ratio of a horizontal size to a vertical size may be separately encoded.

Otherwise, after a value of the maximum size of the macroblock is encoded through the aforementioned method, a value of the minimum size of the macroblock may be encoded through a value of $\log_2$ (the maximum size of the macroblock/the minimum size of the macroblock) indicating a ratio of the minimum size of the macroblock to the maximum size of the macroblock. On the contrary, after a value of the minimum size of the macroblock is encoded through the aforementioned method, a value of the maximum size of the macroblock may be encoded through a value of $\log_2$ (the maximum size of the macroblock/the minimum size of the macroblock).

Further, according to the exemplary embodiment of the present disclosure, the partition information may be encoded and decoded using the tree structure. The partition information is the information related to a size and/or a type of subblocks (i.e. the macroblock partition) for the prediction and/or the transform and may include a maximum size and a minimum size of the subblocks for the prediction and/or the transform, the maximum number of layers included in the tree, and the partition flag. The video encoding apparatus transmits the partition information to the video decoding apparatus.

A maximum size and a minimum size of the subblocks for the prediction and/or the transform may be determined by unit of total image sequences, Group of Pictures (GOPs), pictures, or slices. The information on a maximum size and a minimum size of the subblocks for the prediction and/or the transform and the maximum number of layers included in the tree may be included in the bitstream as the header information of the sequence, GOP, picture, slice, etc.

The macroblock partition flag among the partition information may be encoded using the tree structure. The macroblock partition flag may be included in the header of the macroblock or a header of the macroblock partition corresponding to the encoding unit.

In the meantime, in the case of a size of the subblock for the prediction and/or the transform, i.e. the information on the size of the prediction and/or the transform, a predetermined size of the prediction and/or the transform may be used by separately setting a horizontal size and a vertical size of the prediction and/or the transform for a maximum size and a minimum size of the prediction and/or the transform. Further, hard sizes may be designated as a maximum size value and a minimum size value of the prediction and/or the transform or a multiple by which the prediction and/or the transform is to be expanded or downsized from a predetermined size may be transmitted. If a multiple by which a maximum size of the prediction and/or the transform is to be expanded from a predetermined size is encoded and the predetermined size is 4, a value of $\log_2$ (selected prediction and/or transform size/4) is encoded. For example, when a size of the prediction and/or the transform is 4×4, "0" is encoded, and when a size of the prediction and/or the transform is 8×8, "1" is encoded. Further, a ratio of a horizontal size to a vertical size may be separately encoded.

Otherwise, after a value of the maximum size of the prediction and/or the transform is encoded through the aforementioned method, a value of the minimum size of the prediction and/or the transform may be encoded through a value of $\log_2$ (the maximum size of the prediction and/or the transform/the minimum size of the prediction and/or the transform) indicating a ratio of the minimum size of the prediction and/or the transform to the maximum size of the prediction and/or the transform. On the contrary, after a value of the minimum size of the prediction and/or the transform is encoded through the aforementioned method, a value of the maximum size of the prediction and/or the transform may be encoded through a value of $\log_2$ (the maximum size of the prediction and/or the transform/the minimum size of the prediction and/or the transform).

The coded block information indicating whether a transform coefficient other than "0" is included within a predetermined block may be a flag having a length of 1 bit indicating whether a transform coefficient other than "0" is included within partitioned subblocks for the prediction or the transform. In this event, each flag for a block of the luminance component Y and blocks of the chrominance components U and V may be encoded, and whether a transform coefficient other than "0" is included in the three blocks of the luminance and chrominance components Y, U, and V may be indicated through a single flag.

Otherwise, after a flag indicating that all blocks of three color components Y, U, and V include transform coefficients other than "0" is encoded, a type of transform is encoded when there is a coefficient other than "0" and then each flag indicating whether a subblock of each color component includes a transform coefficient other than "0" may be encoded.

In the meantime, in the aforementioned embodiments, the tree encoder 1410 generates the tree structure of the image information to be encoded in the method of grouping the predetermined areas having the same information among the areas having the image information to be encoded. However, this is merely an example of the generation of the tree structure, and those skilled in the art will appreciate that the tree encoder 1410 may generate the tree structure in various methods. For example, a size of the macroblock or the subblock for the prediction or the transform, which is the unit of the encoding and the decoding may be determined by a method of repeatedly partitioning a reference block (e.g. a macroblock having the maximum size) into subblocks having a smaller size than that of the reference block. That is, the reference block is partitioned into a plurality of first subblocks, and each first subblock is partitioned into a plurality of second subblocks having a smaller size than that of the first subblock or is not partitioned, so that various sizes of macroblocks or the subblocks for the prediction or the transform may be included in one picture. In this event, whether to partition the macroblock or subblock into the subblocks is indicated by the partition flag. Through the aforementioned method, the information (i.e. the macroblock partition flag) on the size of the macroblock or the information (i.e. the macroblock partition flag) on a size of the subblock for the prediction or the transform may have the tree structure illustrated in FIG. 15B or 15C.

In the meantime, a video encoding/decoding apparatus according to at least one embodiment of the present disclosure may be implemented by connecting an encoded data (bitstream) output side of the video encoding apparatus according to any one embodiment of the present disclosure to an encoded data (bitstream) input side of the video decoding apparatus according to any one embodiment of the present disclosure.

The video encoding/decoding apparatus includes: an video encoding apparatus for encoding skip information indicating whether a block to be encoded in an image is a skip block, encoding skip motion information of the block or encoding intra or inter prediction information and transform information of the block according to the skip information, and encoding residual signal information of the block based on the prediction information and the transform information of the block; and a video decoding apparatus for reconstructing skip information indicating whether a block to be decoded is a skip block by decoding a bitstream, reconstructing skip motion information of the block or intra or inter prediction information and transform information of the block by decoding the bitstream according to the skip information, and reconstructing the block based on the skip motion information or reconstructing the block by decoding residual signal information reconstructed by decoding the bitstream based on the prediction information and the transform information.

A video encoding/decoding method according to an embodiment of the present disclosure may be implemented by combining the video encoding method according to any one embodiment of the present disclosure and the video decoding method according to any one embodiment of the present disclosure.

The video encoding/decoding method includes encoding a video by encoding skip information indicating whether a block to be encoded in an image is a skip block, encoding skip motion information of the block or intra or encoding inter prediction information and transform information of the block according to the skip information, and encoding residual signal information of the block based on the prediction information and the transform information; and decoding the video by reconstructing the skip information indicating whether the block to be decoded in the image is the skip block by decoding a bitstream, reconstructing the skip motion information of the block or the intra or inter prediction information and the transform information of the block by decoding the bitstream according to the skip information, and reconstructing the block based on the skip motion information or reconstructing the block by decoding the residual signal information reconstructed by decoding the bitstream based on the prediction information and the transform information.

According to some embodiments of the present disclosure as described above, the improvement of the video compression efficiency is achieved by efficiently encoding the encoding information used for the video encoding and selectively using various encoding methods and decoding methods in the video encoding. Further, an image is encoded and decoded by defining a skip mode of a block in various methods and selectively using the various skip modes depending on a characteristic and/or an implementation scheme of an image or according to a necessity, so that the video compression efficiency is improved. Furthermore, the video compression efficiency is improved by increasing the encoding efficiency through the encoding/decoding of various information of an image by using a tree structure.

Although exemplary embodiments of the present disclosure have been described for illustrative purposes, those skilled in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary embodiments of the present disclosure have not been described for limiting purposes, and the scope of the claimed invention is not limited by the embodiments. The scope of the claimed invention will be construed by the appended claims and all technical spirits within the equivalents of the claims will be construed to be included in the scope of the claimed invention.

What is claimed is:

1. A video decoding apparatus, comprising:
an encoding information decoder configured to
reconstruct a skip information indicating whether a block to be decoded in an image is a skip block by decoding a bitstream, and
reconstruct either a skip motion information of the block, or an intra or inter prediction information of the block and a transform information of the block by decoding the bitstream, according to the skip information; and
a video decoder configured to either reconstruct the block based on the skip motion information or reconstruct the block based on both the prediction information and a residual signal information reconstructed by decoding the bitstream based on the transform information,
wherein the encoding information decoder is configured to reconstruct the transform information which includes partition information related to partitioning the block into subblocks by a tree structure,
wherein the partition information is reconstructed by
reconstructing a side information containing a first information on a difference between a maximum subblock size and a minimum subblock size and a second information on the minimum subblock size by decoding the bitstream,
reconstructing a flag indicating whether each node from a highest layer toward the lowest layer is partitioned into nodes of a lower layer by decoding the bitstream based on the side information, and
identifying a node which is not further partitioned,
wherein the video decoder reconstructs the residual signal information of a subblock corresponding to the node which is not further partitioned.

2. The video decoding apparatus of claim 1, wherein the flag indicating whether a node corresponding to a subblock of the minimum subblock size is partitioned is not included in the bitstream.

3. The video decoding apparatus of claim 1, wherein the flag indicating whether a node corresponding to a subblock larger than the maximum subblock size is partitioned is not included in the bitstream.

4. The video decoding apparatus of claim 1, wherein, when a node is partitioned into nodes of a lower layer, a subblock corresponding to the node is divided into four equal-sized blocks corresponding to the nodes of the lower layer.

5. The video decoding apparatus of claim 1, wherein the block is partitioned into the subblocks which have sizes ranging from the minimum subblock size to maximum subblock size.

6. The video decoding apparatus of claim 1, wherein the first and second information are values of a log scale.

7. The video decoding apparatus of claim 6, wherein the first information is an encoded value of log2 (the maximum subblock size/the minimum subblock size) and the second information is an encoded value of log2 (the minimum subblock size/4).

8. The video decoding apparatus of claim 1, wherein the side information is reconstructed from the bitstream in the unit of sequences.

9. A video decoding method, comprising:
reconstructing a skip information indicating whether a block to be decoded in an image is a skip block by decoding a bitstream;
reconstructing a skip motion information of the block, or reconstructing a prediction information containing an intra prediction mode information or a motion information and a transform information of the block by decoding the bitstream, according to the skip information; and
reconstructing the block based on the skip motion information or reconstructing the block based on both the prediction information and a residual signal information reconstructed by decoding the bitstream based on the transform information, wherein the method further comprises:
reconstructing the transform information which includes partition information related to partitioning the block into subblocks by a tree structure,
wherein the partition information is reconstructed by
reconstructing a side information containing a first information on a difference between a maximum subblock size and a minimum subblock size and a second information on the minimum subblock size by decoding the bitstream,
reconstructing a flag indicating whether a node for each layer from a highest layer toward the lowest layer is partitioned by decoding the bitstream based on the side information, and
identifying a node which is not further partitioned,
wherein the residual signal information is reconstructed for a subblock corresponding to the node which is not further partitioned.

10. The video decoding method of claim 9, wherein the residual signal information additionally includes one or more of a Coded Block Pattern (CBP) of the subblock which is not further partitioned and a delta quantization parameter of the subblock which is not further partitioned.

11. The video decoding method of claim 9, wherein the flag indicating whether a node corresponding to a subblock of the minimum subblock size is partitioned is not included in the bitstream.

12. The video decoding method of claim 9, wherein the flag indicating whether a node corresponding to a subblock larger than the maximum subblock size is partitioned is not included in the bitstream.

13. The video decoding method of claim 9, wherein, when a node is partitioned into nodes of a lower layer, a subblock corresponding to the node is divided into four equal-sized blocks corresponding to the nodes of the lower layer.

14. The video decoding method of claim 9, wherein the block is partitioned into the subblocks which have sizes ranging from the minimum subblock size to maximum subblock size.

15. The video decoding method of claim 9, wherein the first and second information are values of a log scale.

16. The video decoding method of claim 9, wherein the first information is an encoded value of log2 (the maximum subblock size/the minimum subblock size) and the second information is an encoded value of log2 (the minimum subblock size/4).

17. The video decoding method of claim 9, wherein the side information is reconstructed from the bitstream in the unit of sequences.

* * * * *